(12) United States Patent
Yokoi et al.

(10) Patent No.: US 8,498,457 B2
(45) Date of Patent: Jul. 30, 2013

(54) DATA COLLATION APPARATUS

(75) Inventors: Hironori Yokoi, Akashi (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 138 days.

(21) Appl. No.: 13/234,716

(22) Filed: Sep. 16, 2011

(65) Prior Publication Data

US 2012/0002846 A1 Jan. 5, 2012

Related U.S. Application Data

(63) Continuation of application No. PCT/JP2009/055182, filed on Mar. 17, 2009.

(51) Int. Cl.
*G06K 9/00* (2006.01)

(52) U.S. Cl.
USPC .......................................... 382/124; 382/115

(58) Field of Classification Search
USPC .................................................. 382/115–124
See application file for complete search history.

(56) References Cited

U.S. PATENT DOCUMENTS

| | | | |
|---|---|---|---|
| 6,373,968 B2* | 4/2002 | Okano et al. | 382/117 |
| 7,330,570 B2* | 2/2008 | Sogo et al. | 382/115 |
| 7,545,962 B2* | 6/2009 | Peirce et al. | 382/115 |
| 2004/0008873 A1 | 1/2004 | Sogo et al. | |
| 2006/0110011 A1* | 5/2006 | Cohen et al. | 382/115 |

FOREIGN PATENT DOCUMENTS

| | | |
|---|---|---|
| JP | 2000-215316 | 8/2000 |
| JP | 2003-346149 | 12/2003 |
| JP | 2004-78686 | 3/2004 |
| JP | 2004-86463 | 3/2004 |
| JP | 2007-94535 | 4/2007 |
| JP | 2007-115072 | 5/2007 |

OTHER PUBLICATIONS

International Search Report of PCT/JP2009/055182 mailed May 12, 2009.
International Preliminary Report on Patentability, mailed Oct. 27, 2011, in corresponding International Application No. PCT/JP2009/055182 (5 PP.).

* cited by examiner

*Primary Examiner* — Samir A. Ahmed
(74) *Attorney, Agent, or Firm* — Staas & Halsey LLP

(57) ABSTRACT

A data collation apparatus has: a collation unit which calculates a similarity between input data measured by a measurement apparatus and each of registered data; and a calculation unit which adjusts, if a similarity of first registered data of which similarity with the input data is highest is lower than a first threshold, and a difference between the similarities of the first registered data and second registered data of which similarity with the input data is second highest is smaller than a predetermined value, or if a degree of separation to indicate a distance between the similarity of the first registered data and a similarity distribution of a group of registered data items of which similarities with the input data are second highest or lower is smaller than a predetermined value, the parameters of the measurement apparatus, and instructs the measurement apparatus to remeasure the measurement subject.

4 Claims, 19 Drawing Sheets

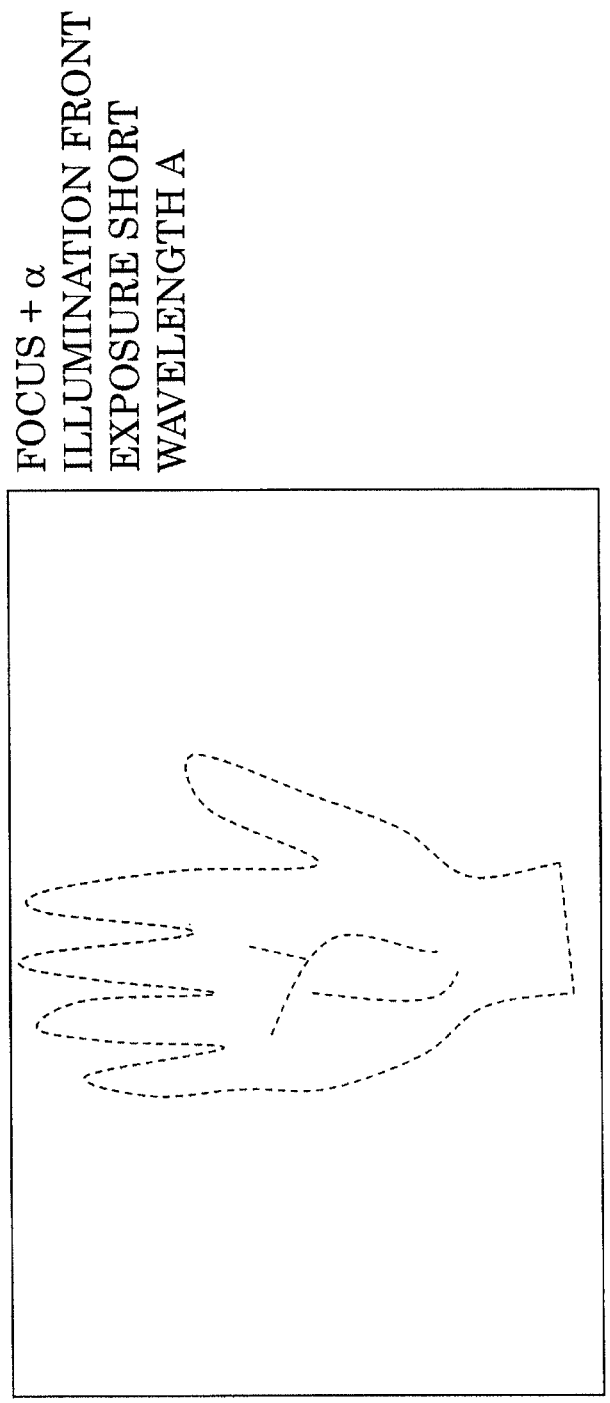

Fig.12

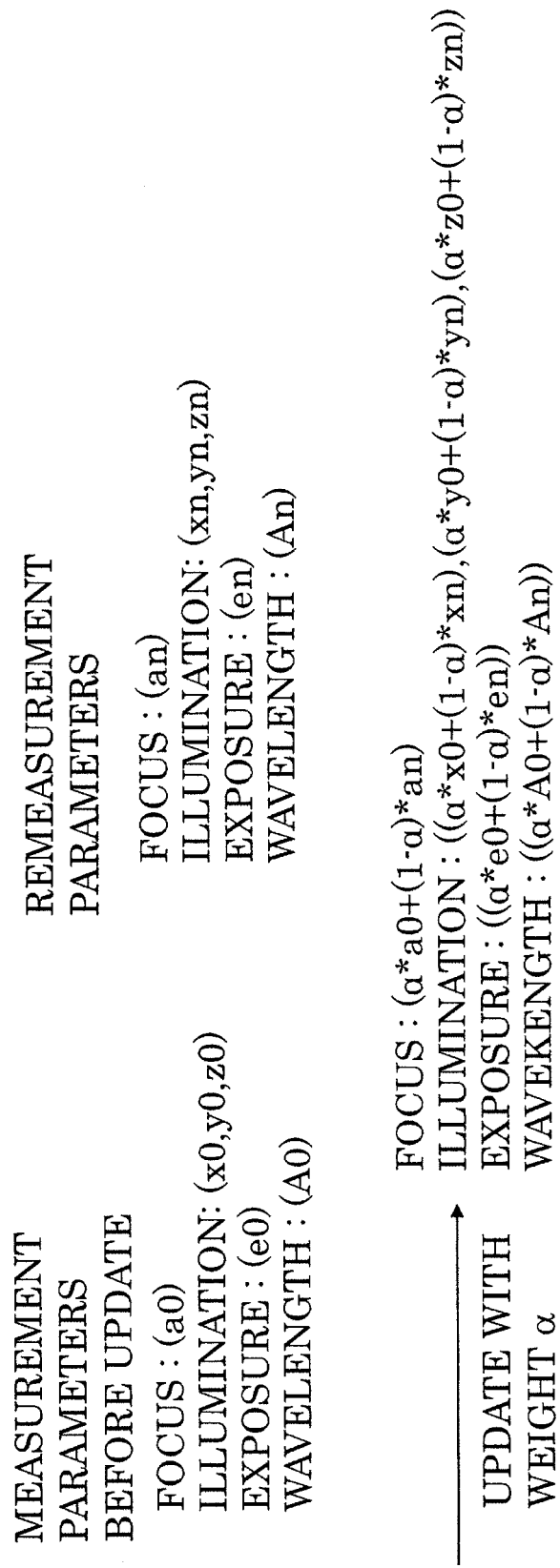

MEASUREMENT PARAMETERS BEFORE UPDATE

FOCUS : (a0)
ILLUMINATION: (x0,y0,z0)
EXPOSURE : (e0)
WAVELENGTH : (A0)

REMEASUREMENT PARAMETERS

FOCUS : (an)
ILLUMINATION: (xn,yn,zn)
EXPOSURE : (en)
WAVELENGTH : (An)

UPDATE WITH WEIGHT $\alpha$

FOCUS : $(\alpha*a0+(1-\alpha)*an)$
ILLUMINATION : $((\alpha*x0+(1-\alpha)*xn),(\alpha*y0+(1-\alpha)*yn),(\alpha*z0+(1-\alpha)*zn))$
EXPOSURE : $((\alpha*e0+(1-\alpha)*en))$
WAVEKENGTH : $((\alpha*A0+(1-\alpha)*An))$ Fig.14
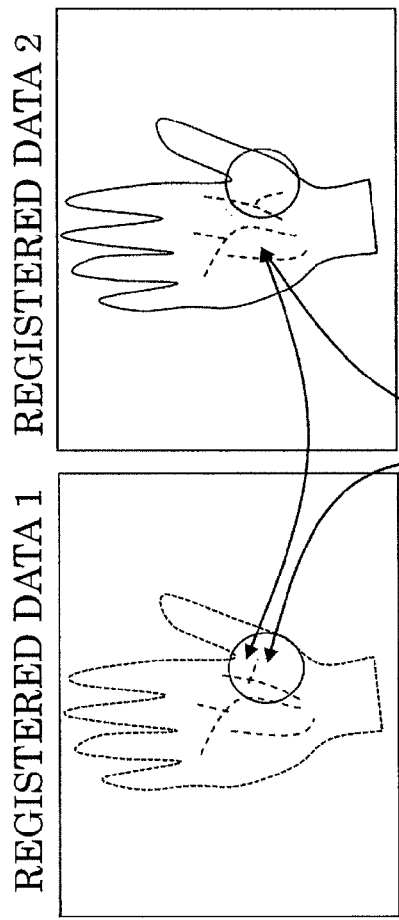
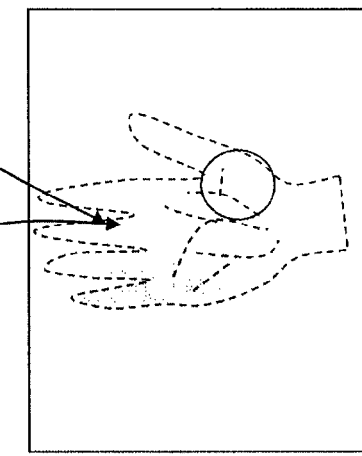

DATA COLLATION APPARATUS

CROSS-REFERENCE TO RELATED APPLICATION

This is a continuation of Application PCT/JP2009/055182, filed on Mar. 17, 2009, now pending, the contents of which are herein wholly incorporated by reference.

FIELD

The present invention relates to a data collation apparatus which specifies, out of a plurality of registered data items, measurement data obtained from a measurement subject that is the same as a measurement subject of input data. An example of the data collation apparatus is a biometric authentication apparatus.

BACKGROUND 1-to-N collation is a method for collating a plurality of registered data items, which are registered in a data base or the like in advance, with newly provided input data, and extracting registered data matching the input data. The 1-to-N collation is used for a biometric authentication system, for example, which collates such biometric data as a vein pattern of a palm or finger prints so as to authenticate a person.

In a biometric authentication system using the 1-to-N collation, input data and registered data are collated respectively, and similarities of the registered data to the input data are calculated. A threshold is set for similarities. In the biometric authentication system, registered data of which similarity is higher than the threshold is used to authenticate a person, which is a measurement subject of the input data.

In such a biometric authentication system, the generation of an authentication error, that is, recognizing input data of an unregistered person as data of a registered person, need to be prevented in terms of security.

One of the available technologies to control authentication errors, there is a technology to adjust the threshold of similarity depending on the situation (Technology 1). For example, if reliability of collation between input data and registered data is low, authentication conditions based on the threshold of similarity are set to be more strict. If the authentication conditions based on the threshold are set to be strict (e.g. setting high threshold), the generation of an authentication error is controlled. However, if an individual not familiar to the system is authenticated and data measurement accuracy drops, for example, the difference between the input data and registered data of this person increases, and similarity decreases. If the similarity decreases, although this person is a registered person, the case that the person is determined to be an unregistered person and is not authenticated is happened, because the threshold is set too high. In this case, this person to be authenticated needs to be measured again by a measurement apparatus, and authentication takes time. This means that convenience may drop if Technology 1, which adjusts the threshold depending on the situation, is used.

Another available technology to control authentication errors is a technology to improve reliability using other authentication methods as well (Technology 2). Other authentication methods include password authentication and biometric authentication using other portions of a biological body. However equipment and operations to support the other authentication methods are required, and convenience and processing speed may drop. In the case of requiring equipment, an increase in cost and installation locations could be problematic.

Therefore according to prior art, authentication errors may be controlled, but convenience could diminish.

[Patent document 1] Japanese Patent Application Laid-Open No. 2004-78686
[Patent document 2] Japanese Patent Application Laid-Open No. 2000-215316
[Patent document 3] Japanese Patent Application Laid-Open No. 2003-346149

SUMMARY

According to one aspect of the present invention is a data collation apparatus. The data collation apparatus has: a collation unit which calculates a similarity to indicate a degree of correspondence between input data which is measured by a measurement apparatus having at least one measurement parameter, and registered data which is stored in a storage apparatus in advance, for each of a plurality of registered data items; and a calculation unit in which, if a difference between the similarity of first registered data of which similarity with the input data is highest and the similarity of second registered data of which similarity with the input data is second highest, among the plurality of registered data items, is smaller than a first predetermined value, or if a degree of separation to indicate a distance between the similarity of the first registered data and a similarity distribution of a group of registered data items of which similarities with the input data are second highest or lower is smaller than a second predetermined value, then the parameter is adjusted based on at least the input data and the first registered data, and remeasuring the measurement subject of the input data is instructed to the measurement apparatus.

If the similarity of the first registered data, of which similarity is the highest, is lower than the first threshold, and the difference between the similarity of the first registered data and the similarity of the second registered data, of which similarity is the second highest, is a first predetermined value or less, or if the similarity of the first registered data is lower than the first threshold, and a degree of separation which indicates the distance between the similarity of the first registered data and the similarity distribution of the group of registered data items of which similarities with the input data are second highest or lower is smaller than a second predetermined value, then the data collation apparatus adjusts the measurement parameter used for remeasurement, so as to be suitable for identifying the registered data of which similarity is high. The measurement apparatus remeasures the measurement subject using the adjusted measurement parameter. The input data obtained by the remeasurement is the measurement data obtained using the measurement parameter which has been adjusted in order to measure the measurement subject more accurately.

Therefore the similarity between the input data obtained by remeasurement and the registered data of the same measurement subject increases. Furthermore, the similarity with the registered data of a different measurement subject decreases, whereby the difference between the similarity with the registered data of the same target and the similarity with the other registered data increases. Therefore if the input data obtained by remeasurement is collated again, the registered data of which similarity is highest is more likely to be the measurement data of the same measurement subject. In other words, since the difference between the similarity of the registered data of which similarity is highest and the similarities of the registered data of which similarities are second highest or lower increases, it is possible to more accurately specify the registered data which is the measurement data obtained from the same measurement subject as that of the input data.

The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4A is a diagram depicting an example of a biometric pattern measured by the measurement apparatus;

FIG. 12 is a diagram depicting an example of update processing for initial values of measurement parameters;

FIG. 14 is a diagram depicting an example of biometric data during remeasurement;

DESCRIPTION OF EMBODIMENTS

A data collation system according to a mode of carrying out the present invention (hereafter called "embodiment") will be described with reference to the drawings. Configurations of the following embodiments are examples, and the disclosed data collation apparatus is not limited to the configurations of the embodiments.

First Embodiment

<<Example of Operation of Data Collation System>>

In the first embodiment, a data collation system applied to biometric authentication using a vein pattern of a palm will be described as an example of a data collation.

Figure 1:
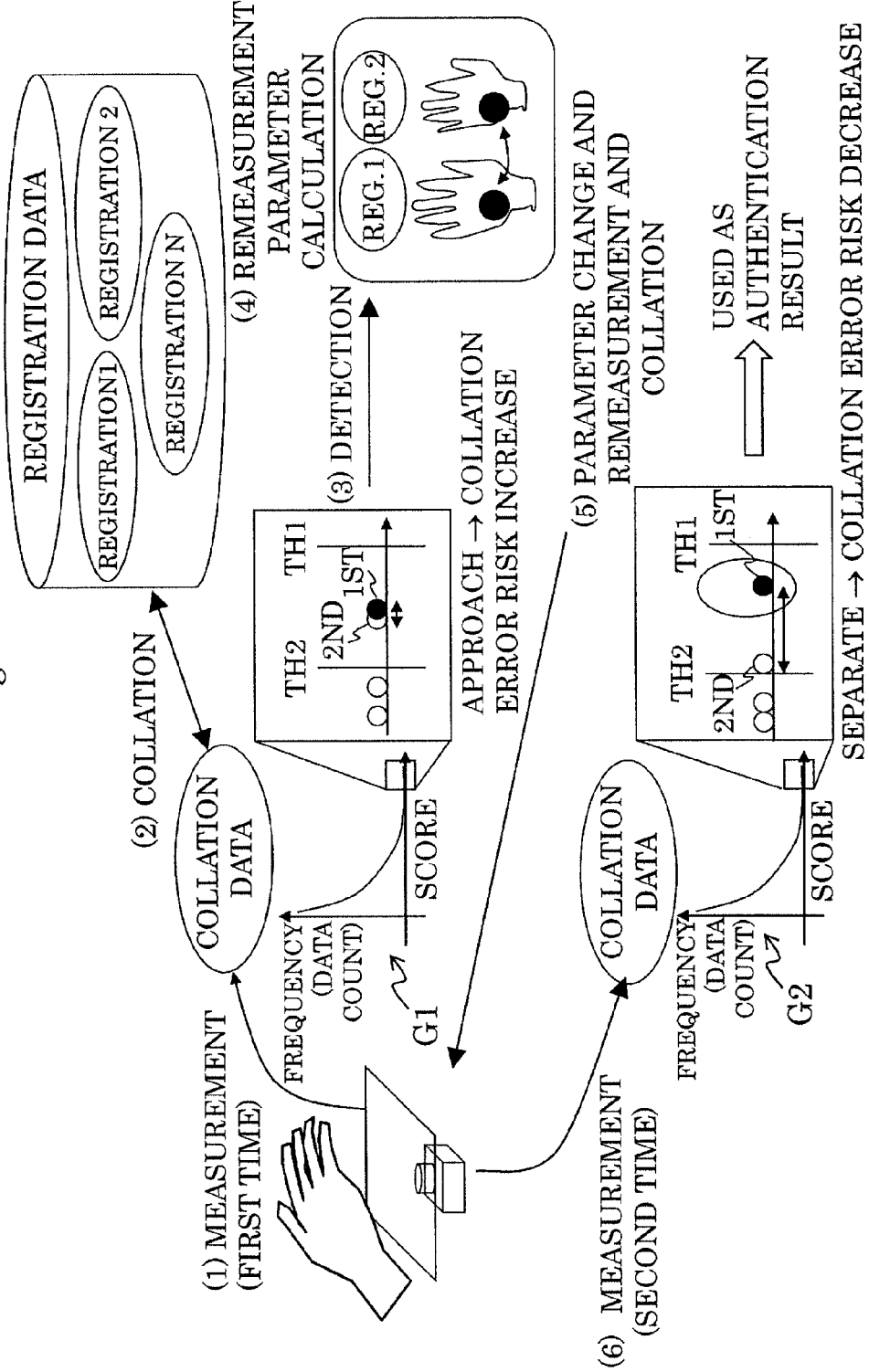
FIG. 1 is a diagram depicting an example of an overview of the operation of a data collation system.

FIG. 1 is a diagram depicting an example of an operation of the data collation system applied to biometric authentication as an example of data collation.

(1) Measurement (First Time)

An authentication subject (a person to be authenticated) places a hand over a measurement apparatus. The measurement apparatus reads a vein pattern of the palm of the authentication subject, performs image processing and creates collation data. In the measurement apparatus, measurement parameters, such as illumination intensity, direction, wavelength, exposure time and focus distance used for measurement are recorded. Using the recorded measurement parameters, the measurement apparatus measures the vein pattern of the palm of the authentication subject.

(2) Collation

Measured vein pattern data (collation data) and preliminary registered vein pattern data (registered data) are collated. Similarity (also called "score") which indicates the likelihood of being data of a same subject as the collation data is calculated for each registered data. Graph G1 in FIG. 1 indicates a graph where the similarity of each registered data at this time is plotted. The abscissa of the graph G1 is similarity, and the ordinate is the number of registered data. In a general authentication system, a similarity calculation method is designed so that the similarity increases as the data is more likely to be data of a same subject. There is one data which is of the same subject, and a majority are data of different subjects. Therefore, in the distribution of similarity, there is a tendency that the number of registered data decreases as similarity increases, as the graph G1 indicates. The registered data having the highest similarity is the registered data which is most likely to be data of a same subject.

The value of similarity, however, has an error which is generated due to the difference of the pattern of individual data and the change of posture during measurement, and similarity of data of a same subject does not always indicate the highest degree. It is also possible that a non-registered user may attempt collation, as in the case of someone impersonating another individual. Therefore the registered data having the highest similarity may not be simply regarded as data of a same subject.

Threshold 1 and threshold 2 may be set for similarity, for example. Threshold 1 is a value of similarity which is high enough to regard (determine) the collation data and the registered data as data of a same subject. Threshold 2 is a value of similarity that is lower than threshold 1, and indicates that the collation data and the registered data are very likely data of a same subject. Threshold 2 is set according to the authentication system so that if the similarity of the collation data and the registered data is lower than threshold 2, the probability that this data is data of a same subject becomes extremely low, even if an error in a predetermined range is generated.

For example, it is assumed that registered data is ranked in order of higher similarity. In the graph G1 in FIG. 1, the similarity of the registered data in the first place and the similarity of the registered data in the second place exist between threshold 1 and threshold 2, and the difference of the similarity of the registered data in the first place and the similarity of the registered data in the second place is small (distance is small). In other words, in the case of the graph G1, there are two registered data of which probability of being a data of a same target as the collation data is higher than a predetermined value, and the similarity of the registered data in the first place and the similarity of the registered data in the second place are close to each other. Since the similarity of the registered data in the first place and the similarity of the registered data in the second place are in a range where the respective ranks are easily switched due to the influence of error, it is difficult to determine which is the data of a same subject as the collation data. In other words, the graph G1 indicates the distribution of similarities in the case when the probability of the occurrence of an authentication error is high. A plurality of difference values of the registered data in the second place or less may be considered. In other words, for the similarity of the registered data in the first place, the distribution of difference values from the similarity of each registered data in the second place or less is determined. The value corresponding to the distance of similarities of the registered data in the first place from this distribution is defined and used using a known method, whereby a case when the probability of the occurrence of an authentication error is high can be more accurately discerned.

(3) Detection of High Rank Data

In the case of the similarity distribution illustrated in graph G1, the registered data in the first place and the registered data in the second place or less, which are close to the registered data in the first place, are extracted by threshold processing for the similarity, difference value or distribution distance value. The extracted registered data is called "high score group". The registered data in the high score group and the collation data are compared, and the common portion and the difference portion (or biometric characteristics such as skin material) are analyzed.

(4) Calculation of Measurement Parameter for Remeasurement

Based on the result of the analysis, the measurement parameters (remeasurement parameters) for enhancing the difference portion between the collation data and each registered data (for clarifying the difference portion of the collation data) are calculated. The measurement parameters calculated here are for setting various means that can be changed and adjusted in the measurement apparatus, or the state thereof, and are, for example, illumination intensity, direction, wavelength, exposure time and focus position. The number of parameters to be calculated may be one or many.

(5) Change of Measurement Parameters

Measurement parameters of the measurement apparatus are changed to the calculated measurement parameters.

(6) Measurement (Second Time)

Remeasurement is performed using the calculated measurement parameters. The obtained collation data and registered data are collated again, and similarity is calculated. The graph G2 indicates a graph where the similarity of the collation data and each registered data is plotted.

In the graph G2, the registered data of which similarity is in the first place is between threshold 1 and threshold 2, and the difference between the similarity of the registered data in the first place and the similarity of the registered data in the second place is greater than the difference in the graph G1. In other words, although the registered data in the first place cannot be unconditionally determined as the data of a same subject as the collation data, an authentication error is less likely to occur since the similarity is sufficiently higher than the registered data in the second place or less. Hence the registered data in the first place can be specified as data of a same subject as the collation data. The registered data in the first place is adopted, and the result, to notify that the authentication subject is authenticated correctly, is output.

As the processing (1) to the processing (6) indicate, if the probability of generating an authentication error is high, the collation data and the registered data are verified, and measurement parameters are adjusted. Then data on the authentication subject is measured again using the adjusted measurement parameters, and the measured data is collated with the registered data again. As a result, the generation of authentication errors can be controlled.

<<Configuration Example of Data Collation System>>

Figure 2:
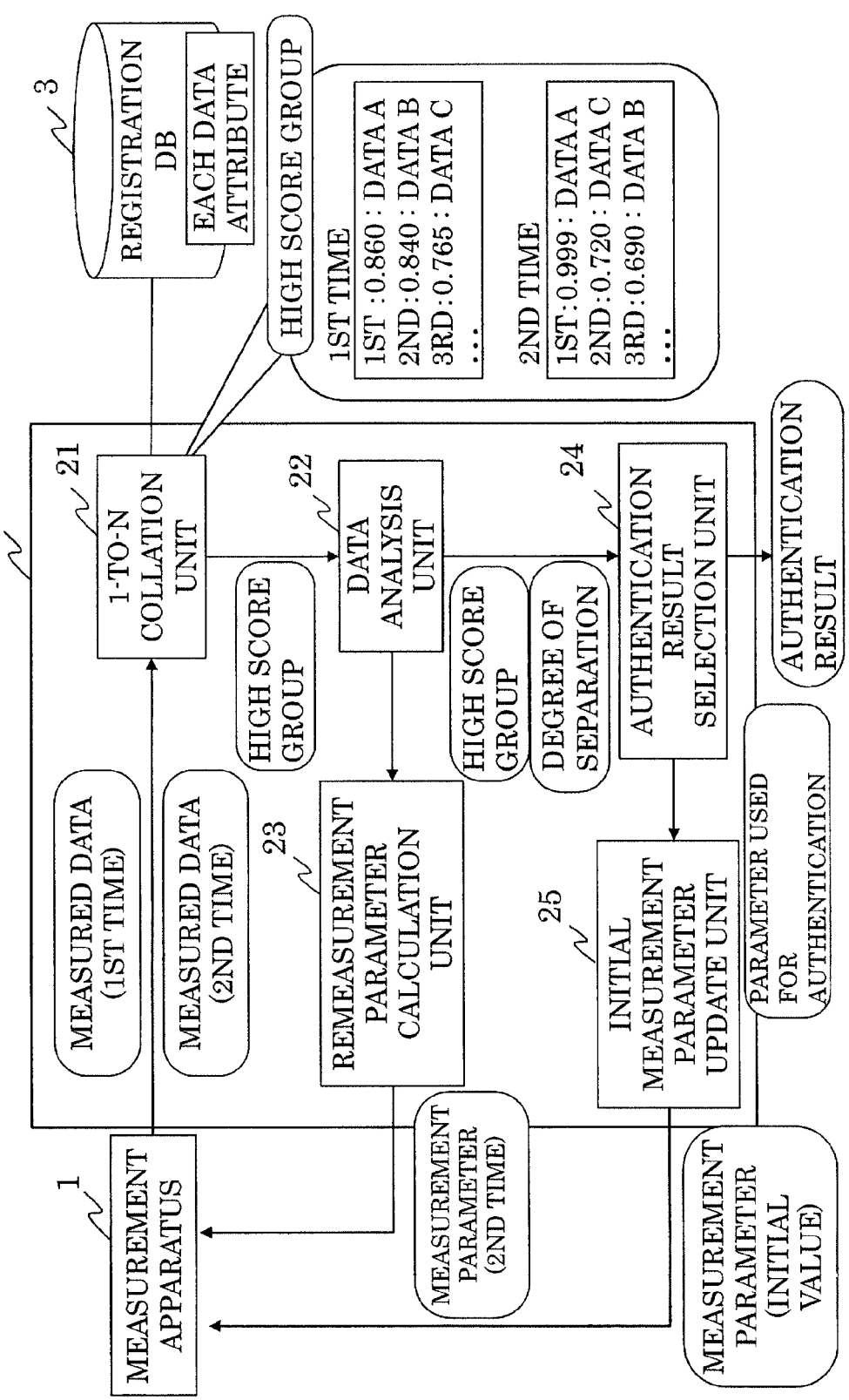
FIG. 2 is a diagram depicting a configuration example of the data collation system.

FIG. 2 is a diagram depicting a configuration example of the data collation system. The data collation system has a measurement apparatus 1 (corresponds to the "measurement apparatus"), a processing server 2 (corresponds to the "data collation apparatus"), and a registration data base 3. The measurement apparatus 1 is connected to the processing server 2 via a communication cable etc. The registration data base 3 (corresponds to the "storage apparatus") is connected to the processing server 2 via a communication cable etc. The processing server 2 has a 1-to-N collation unit 21, a data analysis unit 22, a remeasurement parameter calculation unit 23, an authentication result selection unit 24, and an initial measurement parameter update unit 25 or the like.

The measurement apparatus 1 is an apparatus for measuring the biometric information of an authentication subject. There are two types of measurement apparatus 1: a non-contact type measurement apparatus which can measure biometric information without contacting the authentication subject; and a contact type measurement apparatus which measures biometric information by contacting the authentication subject. Examples of the non-contact type measurement apparatus are measurement apparatuses to measure vein patterns acquired by an image sensor using light waves, electromagnetic waves or ultrasonic waves. An example of the contact type measurement apparatus measures fingerprint patterns using a capacitance sensor. In the first embodiment, a non-contact type measurement apparatus which measures a vein pattern of a palm will be described as an example of the measurement apparatus 1.

Figure 3:
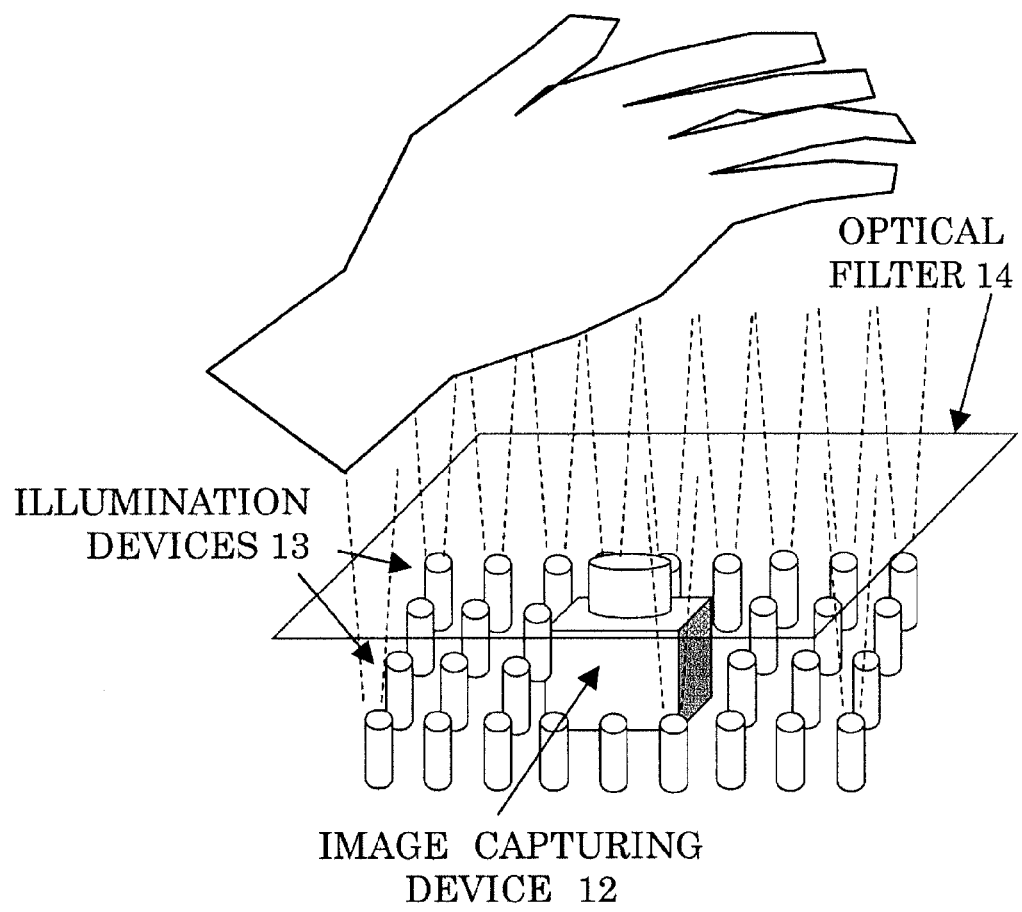
FIG. 3 is a diagram depicting an example of a measurement apparatus.

FIG. 3 is a diagram depicting an example of the measurement apparatus 1. The measurement apparatus 1 includes an image capturing device 12, a plurality of illumination devices 13, and an optical filter 14.

The image capturing device 12 has an image sensor. An example of the image sensor is an camera such as a CCD (Charge Coupled Device) element or a CMOS (Complementary Metal Oxide Semiconductor) element. An optical filter 14 is installed in front of an image sensor of the image capturing device 12.

The optical filter 14 transmits only specific signals (wavelengths), and reduces unnecessary external light. If an image capturing target (e.g. palm) of an authentication subject is positioned facing the image sensor of the image capturing device 12, the image sensor detects and obtains signals from the image capturing target of the authentication subject. For example, the illumination devices 13 irradiate near infrared rays onto the image capturing target, and the image sensor of the image capturing device 12 receives the reflected near infrared rays, so as to read the biometric information of the image capturing target. The image capturing apparatus 12 extracts the vein pattern from the captured image, and generates a vein pattern image. The generated vein pattern image is transmitted to the processing server 2 as the collation data for the authentication subject. The wavelengths that the image sensor receives (measures) are not limited to that of infrared rays. The wavelengths that the image sensor receives (measures) can be selected using the transmission wavelengths of the optical filter 14.

Illumination devices 13 are installed around the image capturing device 12 at a predetermined interval. The illumination device 13 is implemented by an LED (Light Emitting Diode), for example. The optical filter 14 transmits only specific signals (wavelengths), and reduces unnecessary external light.

Upon measurement, it is a precondition that there is phenomena which generates physical phenomena, including the biometric information of the subject. For example, in the first embodiment, signals, such as illumination of the illumination devices 13, which generate signals, are generically called "probe signals". Probe signals are generated by an apparatus in many general measuring systems. A phenomena (e.g. natural light) originally existing in an ambient environment may be used passively. If the phenomena has known characteristics as a signal or which is measurable, the phenomena can be used as a probe signal. If the apparatus itself generates a probe signal, the characteristics are normally known. In other words, the characteristics, such as the illumination intensity and the illumination direction of the illumination device 13 of the measurement apparatus 1, can be known in advance, since these characteristics are measurable. Probe signals generated by the apparatus itself are controllable in many cases.

By the probe signals acting on the subject, phenomena of the measurement subject, such as reflected light, are generated according to the probe signal. Phenomena generated by probe signals are hereafter generically called "reflection signals". Biometric measurement processing is processing that measures reflection signals from the subject, which are generated by probe signals, and detecting and recording pattern data unique to the biometric area, such as the positions and materials of the tissue.

In the measurement apparatus 1, measurement conditions, including exposure time, wavelength to be used, focus position, illumination intensity and illumination direction etc., can be changed. These changeable (controllable) measurement conditions are called "measurement parameters". A parameter on a method for generating probe signals, among the measurement parameters, is hereafter called "probe signal control parameter". Examples of a probe signal control parameter used in the first embodiment are illumination intensity and illumination direction. Among measurement parameters, a parameter on measuring a reflection signal is hereafter called "reflection signal parameter". Examples of the reflection signal parameter in the first embodiment are the wavelength band of the optical filter 14, focus position in the measurement, exposure time, and degree of image analysis.

The measurement apparatus 1 is a non-contact measurement apparatus. The authentication subject is authenticated merely by placing a hand over the measurement apparatus 1, for example. According to the first embodiment, it is assumed that the measurement apparatus 1 is used without a guide to position a hand during authentication (during capture of an image of veins of the palm). This means that a distance between the measurement apparatus 1 and the palm of the authentication subject, a position of the palm where illumination of the illumination devices 13 is irradiated, and an angle of the palm, change greatly at each authentication.

Figure 4B:
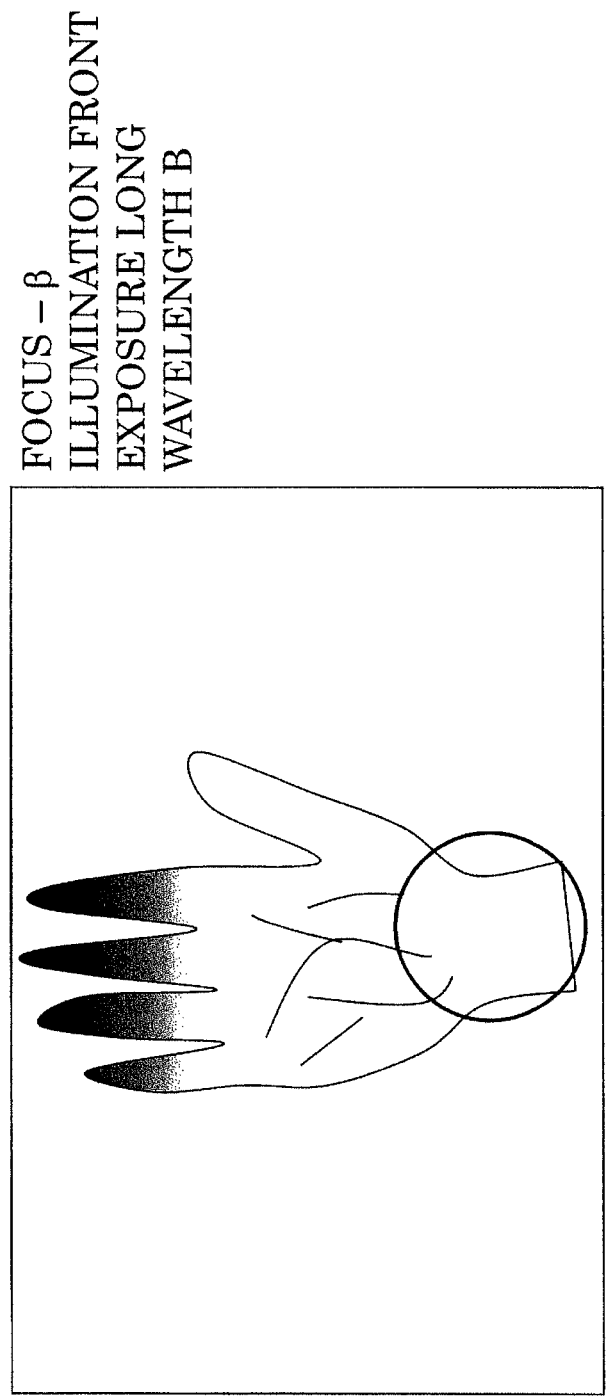
FIG. 4B is a diagram depicting an example of a biometric pattern measured by the measurement apparatus.
Figure 4C:
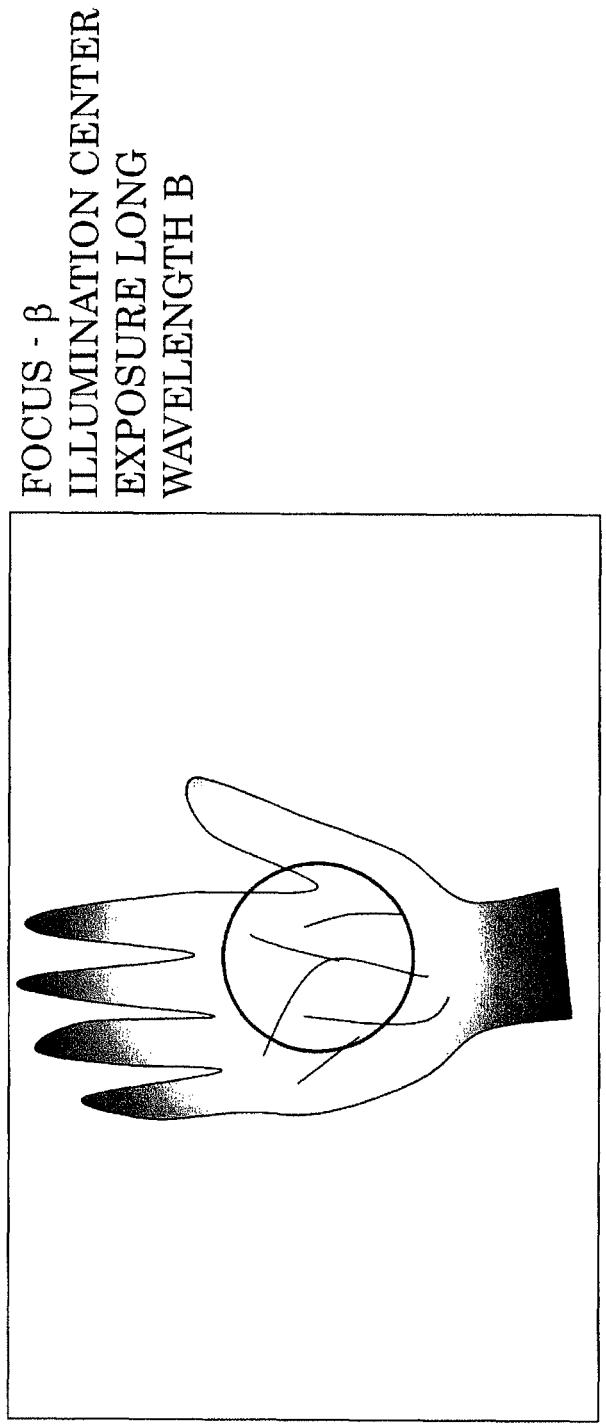
FIG. 4C is a diagram depicting an example of a biometric pattern measured by the measurement apparatus.

FIG. 4A to FIG. 4C are diagrams respectively depicting an example of a biometric pattern measured by the measurement apparatus 1. The measurement apparatus 1 is assumed to be an apparatus for measuring a vein pattern of a right hand. FIG. 4A is an example of a biometric pattern where the subject is not focused and the image is generally blurred. FIG. 4B is an example of the biometric pattern where the subject is focused, but illumination is irradiated concentrating on the wrist side of the right hand. In the case of the example in FIG. 4B, the vein pattern from the palm to the fingertips are not irradiated, and is not clear. FIG. 4C is an example of the biometric pattern where the subject is focused, but illumination is irradiated concentrating on the center portion of the palm of the right hand. In the case of the example in FIG. 4C, the vein pattern on the edges of the palm is not clear, since illumination is concentrated on the center portion of the palm.

A characteristic of the measurement apparatus 1 is that a guide for placing a hand of an authentication subject is not available, so the position of the hand of the authentication subject is unstable. As a result, the captured images of the biometric patterns disperse. However it is difficult to control the parameters on the authentication subject (e.g. distance between the measurement apparatus 1 and the hand, angle of the palm with respect to the measurement apparatus 1), since these parameters change each time authentication is performed. According to the first embodiment, the controllable measurement parameters on a measurement apparatus 1 are adjusted within the time where parameters on the authentication subject do not change.

Referring back to FIG. 2, the registration data base 3 stores the biometric patterns of veins of palms of N number (N: natural number) of authentication subjects measured by the measurement apparatus 1 in advance. The biometric patterns of veins of palms of the authentication subjects stored in the registration data base 3 are called "registered data".

The processing server 2 receives biometric data (collation data) from the measurement apparatus 1, collates the registered data stored in the registration data base 3 with the collation data, and outputs the authentication result. The processing server 2 also controls the measurement parameters of the measurement apparatus 1 based on the result of collation between the biometric data and the registered data.

Figure 5:
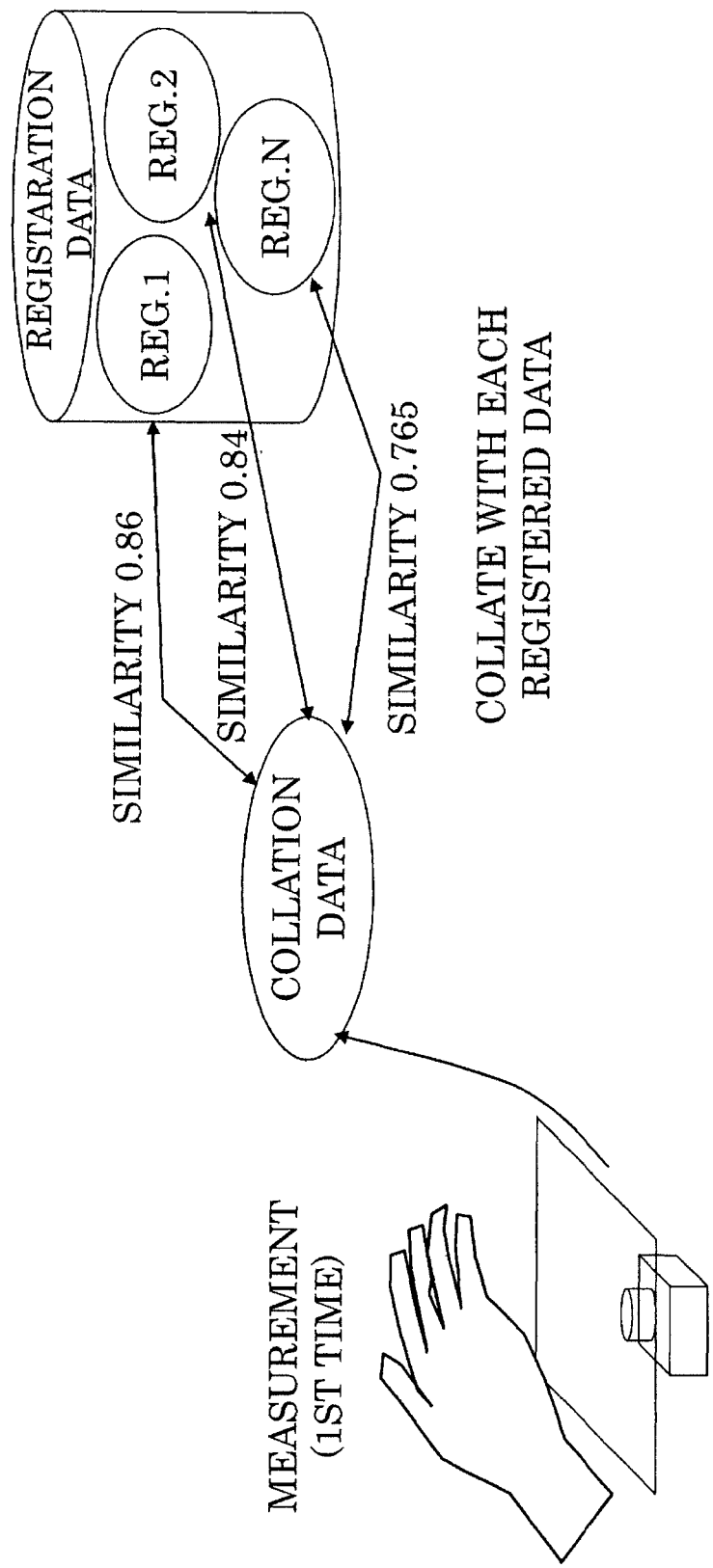
FIG. 5 is a diagram depicting an example of a 1-to-N collation processing executed by a 1-to-N collation unit of a processing server.

FIG. 5 is a diagram depicting an example of 1-to-N collation processing executed by the 1-to-N collation unit 21 (corresponds to the "collation unit") of the processing server 2. The 1-to-N collation unit 21 receives collation data from the measurement apparatus 1. The 1-to-N collation unit 21 collates the received collation data and N number of registered data stored in the registration data base 3 respectively. Then the 1-to-N collation unit 21 calculates similarity of the collation data and each registered data.

An example of a method for collating the collation data and the registered data by the 1-to-N collation unit 21 is as follows.

First the 1-to-N collation unit 21 aligns the collation data and one of the N number of registered data. Alignment is performed using the contours of the palms of both data. If the entire palms are aligned using the contours of the palms, positions of the veins inside the palms are also naturally aligned.

After aligning the collation data and registered data, the 1-to-N collation unit 21 superposes the collation data and the registered data, and determines similarity of the collation data and registered data. For example, the 1-to-N collation unit 21 searches whether the characteristic points in thickness and the directions of the veins match in coordinates where the collation data and registered data correspond. In each coordinate, the 1-to-N collation unit 21 calculates similarity by totaling the characteristic points where the collation data and registered data match. In other words, the value of similarity increases as the number of matching characteristic points increase in each coordinate. In the example in FIG. 5, the maximum number of the similarity is 1. If the value of similarities is 1, it means that two data completely match.

Figure 6:
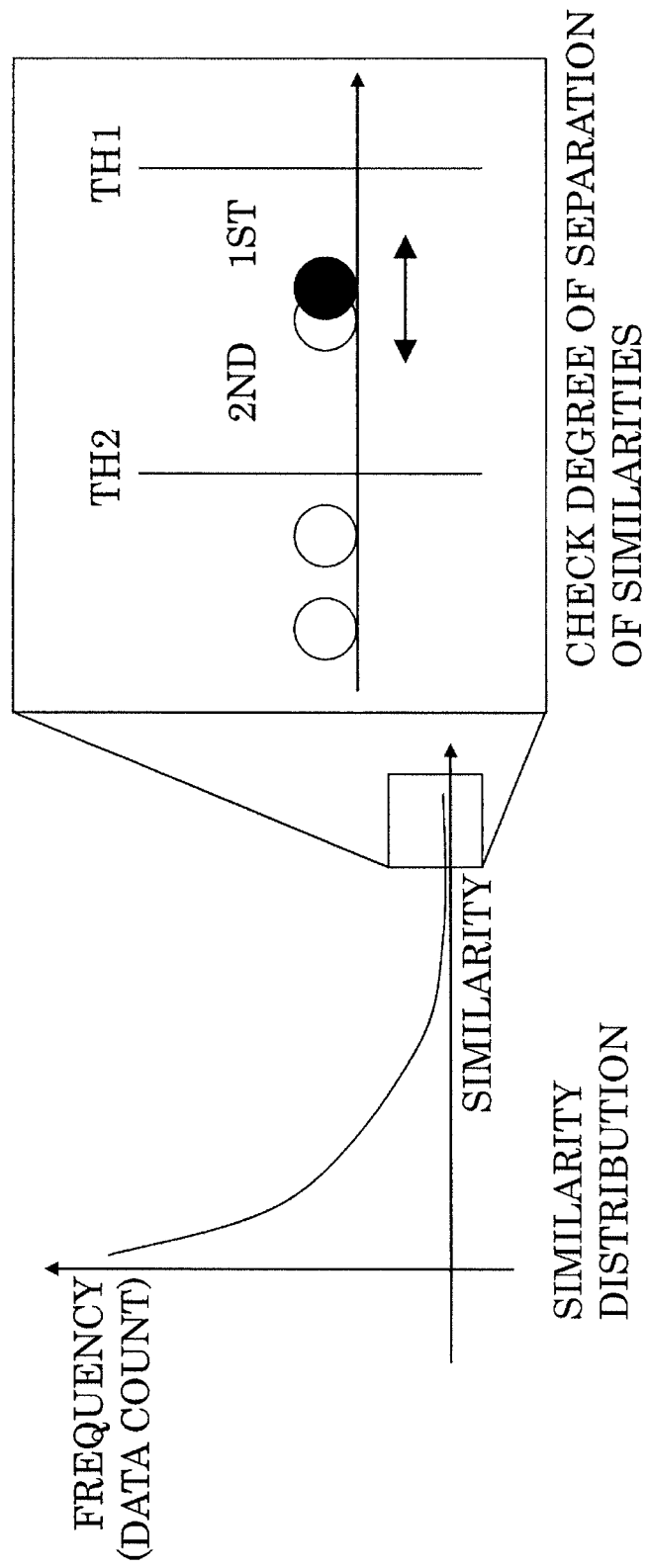
FIG. 6 is a diagram depicting an example of high score group extraction processing and degree of separation calculation processing executed by a data analysis unit.

FIG. 6 is a diagram depicting an example of a high score group extraction processing and degree of separation calculation processing performed by the data analysis unit 22 (corresponds to "determination unit"). The data analysis unit 22 rearranges the registered data in the order of higher similarity. Out of the rearranged registered data, the data analysis unit 22 extracts higher data in terms of similarity using a threshold etc. which is set in advance. The extracted group of higher data is hereafter called "high score group".

The threshold used for extracting the high score group is specified in a range of similarity where it is highly probable that the subject of the registered data and that of the collation data are the same. The threshold used for extracting the high score group is defined as threshold 2. In addition to the threshold 2, a threshold whereby the subject of the registered data and that of the collation data are regarded as the same is set as threshold 1. The threshold 1 is sufficiently closer to the maximum value of similarity than the threshold 2.

Then the data analysis unit 22 determines the degree of separation between the registered data in the first place and the registered data in the second place. The degree of separation is determined using a difference of the similarity of the registered data in the first place and that of the registered data in the second place, for example. For the degree of separation, a distance value may be determined from the distribution of each difference of the registered data in the first place with a plurality of registered data items in the second place or less, using a known distance calculation method. In this case, polarization of the difference value distribution corresponds to the degree of separation. In other words, the threshold for the difference of the registered data in the first place and the registered data in the second place is expressed as a reference distribution, and a threshold processing corresponds to determination, based on polarization of difference value distribution that is too large or too small with respect to the reference distribution. The data analysis unit 22 determines which processing unit the information of the high score group is transferred next, using the similarity and degree of separation of each registered data.

Figure 7:
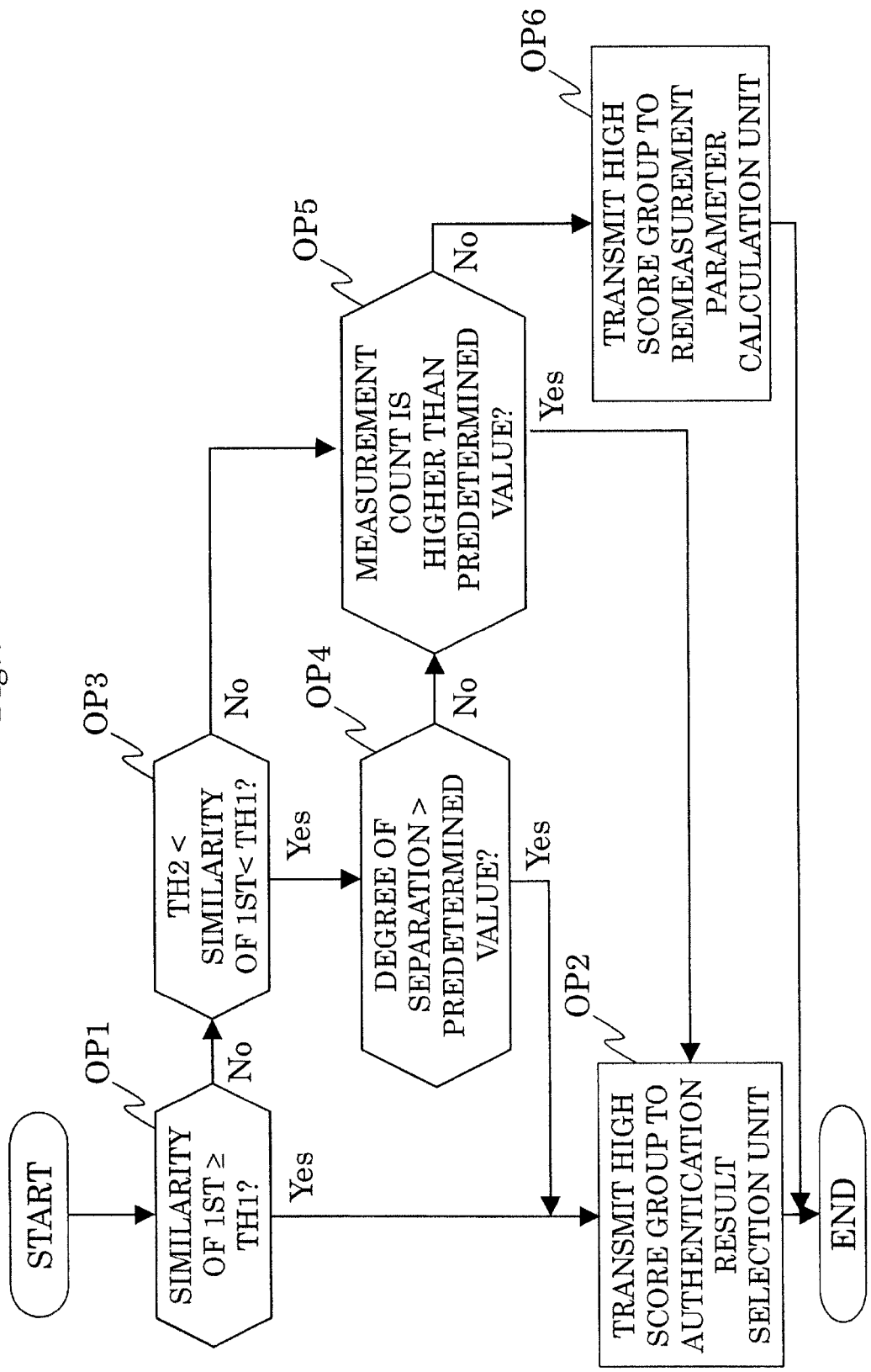
FIG. 7 is a flow chart depicting an example of a determination processing executed by the data analysis unit.

FIG. 7 is a flow chart depicting an example of the determination processing for the data analysis unit 22 to determine a processing unit to which data of the high score group is transferred.

The data analysis unit 22 first determines whether the similarity of the registered data in the first place is the threshold 1 or higher (OP1). If the similarity of the registered data in the first place is the threshold 1 or higher (OP1: YES), it can be determined that the subject of the registered data in the first place and that of the collation data are the same. In other words, authentication of the authentication subject succeeded. The data analysis unit 22 therefore transmits a notice of the authentication success and information on the high score group (e.g. registered data, similarity) to the authentication result selection unit 24 (OP2).

If the similarity of the registered data in the first place is smaller than the threshold 1 (OP1: NO), the data analysis unit 22 determines whether the similarity of the registered data in the first place is greater than the threshold 2, and is smaller than the threshold 1 (OP3). If the similarity of the registered data in the first place is greater than the threshold 2, and is smaller than the threshold 1 (OP3: YES), then it is determined whether the degree of separation between the registered data in the first place and the registered data in the second place is greater than a predetermined value (OP4).

If the degree of separation between the registered data in the first place and the registered data in the second place is greater than the predetermined value (OP4: YES), it can be regarded that the subject of the registered data in the first place and that of the collation are the same. In other words, authentication of the authentication subject succeeded. The data analysis unit 22 therefore transmits a notice of authentication success and information on the high score group (e.g. registered data, similarity, measurement parameters) to the authentication result selection unit 24 (OP2).

If the degree of separation between the registered data in the first place and the registered data in the second place is the predetermined value or less (OP4: NO), it is difficult to determine which of this data is data of the subject which is the same as the collation data. Hence data of the authentication subject need to be measured again in order to specify the registered data of the authentication subject more clearly. The data analysis unit 22 then determines whether a measurement count is a predetermined value (e.g. three times) or more (OP5).

If the measurement count is a predetermined value or more (OP5: YES), the data analysis unit 22 determines that a good result can no longer be obtained even if remeasurement is repeated. In other words, if the measurement count is a predetermined value or more, it means that authentication of the authentication subject failed. The data analysis unit 22 transmits a notice of the authentication failure and information on the high score group (e.g. registered data, similarity, measurement parameters) to the authentication result selection unit 24 (OP2).

If the measurement count is smaller than the predetermined value (OP5: NO), the data analysis unit 22 adjusts the measurement parameters, and transmits the information on the high score group to the remeasurement parameter calculation unit 23 in order to remeasure the authentication subject (OP6).

In OP3, if the similarity of the registered data in the first place is greater than the threshold 2 and not smaller than the threshold 1 (OP3: NO), that is, if the similarity of the registered data in the first place is the threshold 2 or less, the data analysis unit 22 determines whether the measurement count is greater than the predetermined value (OP5). If the measurement count is greater than the predetermined value (OP5: YES), it means that the authentication failed. If the measurement count is the predetermined value or less (OP5: NO), the measurement parameters are adjusted and remeasured.

Summarizing the above description, the data analysis unit 22 transmits a notice of the authentication success and information on the high score group to the authentication result selection unit 24 if (1) the similarity of the registered data in the first place is the threshold 1 or higher, and (2) the similarity of the first registered data is greater than the threshold 2 and smaller than the threshold 1, and the degree of separation of the registered data in the first place and the registered data in the second place is greater than a predetermined value. If a measurement count is a predetermined count or less in a case other than (1) or (2), the data analysis unit 22 transmits the information on the high score group to the remeasurement parameter calculation unit 23. If the measurement count is greater than the predetermined count in a case other than (1) or (2), the data analysis unit 22 transmits a notice of authentication failure and information on the high score group to the authentication result selection unit 24.

The remeasurement parameter calculation unit 23 (corresponds to the "calculation unit") calculates measurement parameters (remeasurement parameters) used for remeasuring the data on the authentication subject based on the information on the high score group received from the data analysis unit 22. A method for adjusting the measurement parameters used in the first embodiment includes two major types of processing. The first processing is extracting difference portions between the collation data and the registered data included in the high score group. The second processing is adjusting the measurement parameters to be used for remeasurement so that the data on the extracted difference portions can be measured more accurately.

Figure 8:
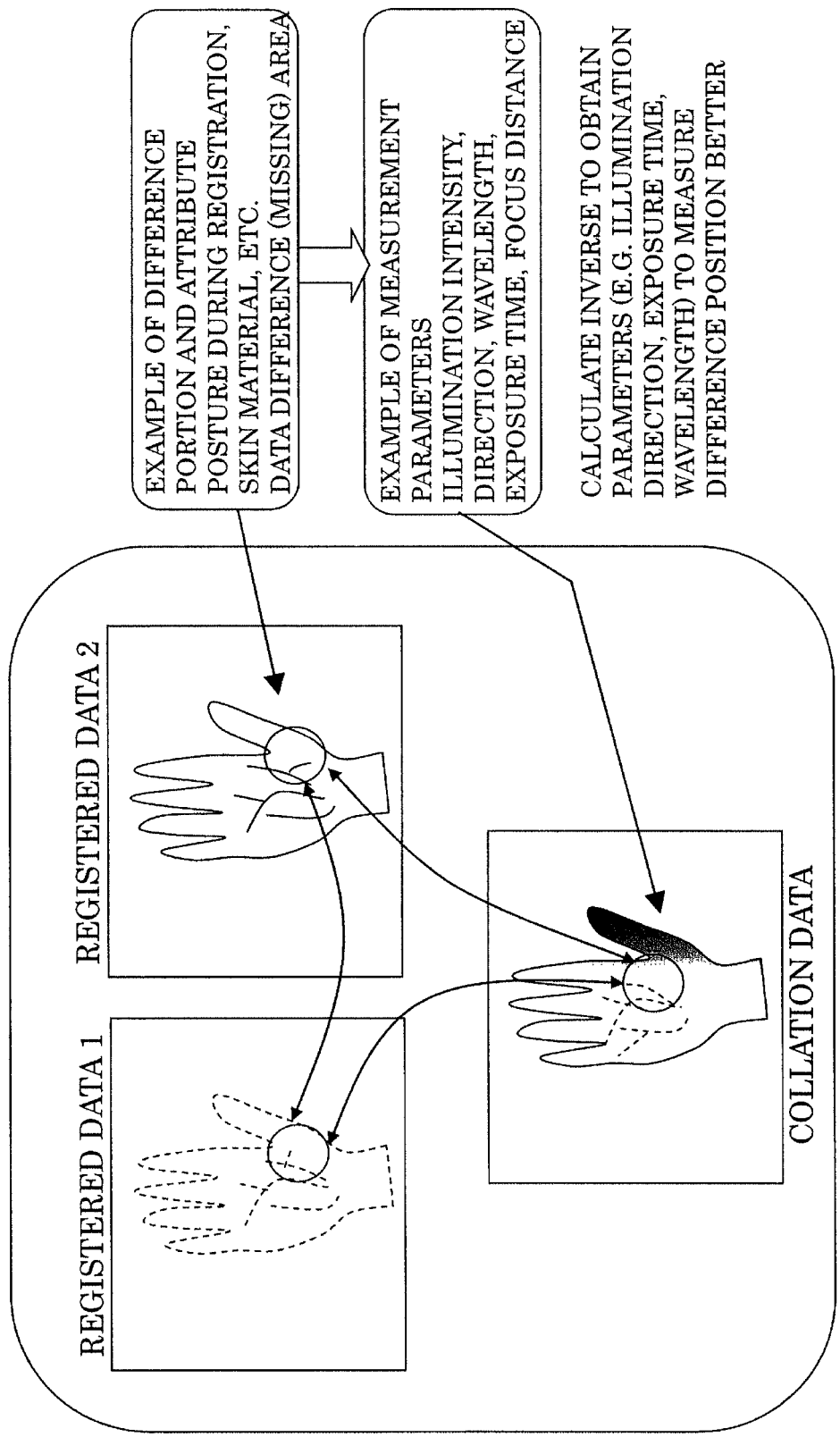
FIG. 8 is a diagram depicting an example of a difference portion extraction processing.

FIG. 8 is a diagram depicting an example of the processing for extracting the difference portions. FIG. 8 indicates the collation data, and registered data 1 in the first place and registered data 2 in the second place included in the high score group.

Just like the 1-to-N collation unit 21, the remeasurement parameter calculation unit 23 collates the collation data and the registered data 1, and the collation data and registered data 2. The remeasurement parameter calculation unit 23 lists the difference position between the collation data and registered data 1 and the difference portion between the collation data and registered data 2. An example of the difference portion to be listed is a missing area where the characteristic points of the image (e.g. thickness and direction of veins), which exists in the registered data, do not exist in the collation data.

The remeasurement parameter calculation unit 23 extracts the difference portions that are listed. The remeasurement parameter calculation unit 23 determines better measurement parameters for more accurate remeasurement of the extracted difference portions.

In the area circled in each data in the example in FIG. 8, a vein pattern exists in the registered data 1 and registered data 2, but the vein pattern is not detected in the collation data. Such a difference portion is generated by the difference of parameters, such as the posture of the subject, skin material, illumination intensity, illumination direction, wavelength, exposure time and focus distance during measurement of the collation data and registered data. In the case of FIG. 8, the vein pattern in the circled area is different between registered data 1 and registered data 2. In registered data 1, a branched portion of the veins is on the thumb side, while in registered data 2, a branched portion of the veins is on the wrist side. Since this difference exists in the circled areas between registered data 1 and registered data 2, the registered data 1 and registered data 2 can be distinguished by verifying this difference area.

Furthermore, in the collation data in FIG. 8, the circled area deviates somewhat from the irradiation range of the illumination, so the measurement accuracy of this area is insufficient. In the collation data in FIG. 8, location, and directions of branching of the veins, or whether branching actually exists or not, are unknown in the circled area. Therefore remeasurement parameters to remeasure this area of the palm of the authentication subject accurately are determined. In the case of the example in FIG. 8, the main cause of dropping measurement accuracy is the deviation of this area away from the illumination range. Therefore in the case of the example in FIG. 8, the remeasurement parameter calculation unit 23 adjusts the measurement parameters, such as illumination intensity, so as to include this area in the verification range.

To extract the difference portions between the collation data and each of the registered data, for example, common portions of the difference portions between the collation data and registered data 1, and the difference portions between the collation data and registered data 2 may be extracted. Difference portions listed in one of the difference portions between the collation data and registered data 1 and the difference portions between the collation data and registered data 2 may be extracted. Or all the difference portions of the difference portions between the collation data and registered data 1 and the difference portions between the collation data and registered data 2 may be extracted.

After the processing for extracting difference portions between the collation data and each of the registered data, the remeasurement parameter calculation unit 23 executes the measurement parameter adjustment processing for accurately remeasuring the extracted difference portions. An example of the parameter adjustment processing is as follows.

(1) Adjusting 1 Type of Measurement Parameter

As a simplest example of the measurement parameter adjustment processing, a case of adjusting one measurement parameter will be described. In the following description, a case when the measurement parameter is the light quantity of each illumination device 13 of the measurement apparatus 1 illustrated in FIG. 3 will be described.

Figure 9:
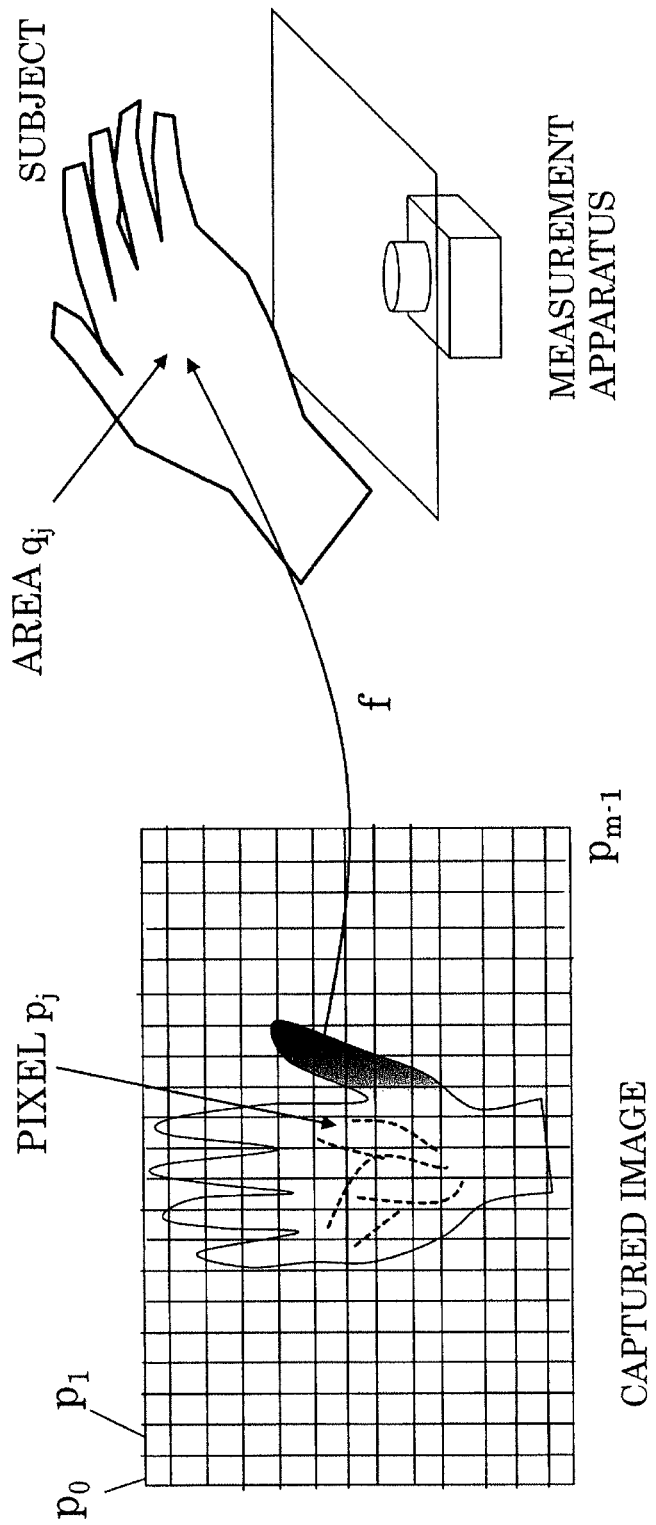
FIG. 9 is a diagram depicting an example of correspondence of a pixel in a captured image (collation data) and a subject area.

FIG. 9 is a diagram depicting an example of the correspondence of a pixel in the captured image (collation data) and an area of the subject. It is assumed that the measurement apparatus 1 can measure a position of a subject (relative position from the measurement apparatus 1) during measurement. It is also assumed that the optical characteristics, including angle of view and lens distortion, of the measurement apparatus 1 are corrected when necessary and are known. In this case, the correspondence of each area of the subject and each pixel in the captured images can be determined by the following method. The relationship of a pixel $p_j$ in the captured image and a corresponding area position $q_j$, which is represented by a function f, is given by the following Eq. 1 (m is a total number of pixels and is $0 \leq j \leq m-1$).

$$f(p_j) = q_j \quad \text{(Eq. 1)}$$

Here, a following relational expression Eq. 2 where a position of each area is multiplied by a coefficient $c_j$, is established between the irradiated quantity of light $v(q_j)$ to each area and brightness value $v_p(p_j)$ of each pixel corresponding to each area. The coefficient $c_j$ is a coefficient (known) which is determined according to the characteristics of the measurement apparatus 1.

$$v_p(p_j) = c_j \cdot v(f(p_j)) = c_j \cdot v(q_j) \quad \text{(Eq. 2)}$$

To simplify the expression, a vector in which brightness values $v_p(p_j)$ of all the pixels are lined up is denoted with $v_p$. A matrix of which diagonal element is the coefficient $c_j$, and the non-diagonal terms are value 0, is denoted with C. If C is used, the brightness vector $v_p$ is given by Eq. 3.

$$v_p = \begin{pmatrix} v_p(p_0) \\ \vdots \\ v_p(p_{m-1}) \end{pmatrix}$$

$$C = \begin{pmatrix} c_0 & & 0 \\ & \ddots & \\ 0 & & c_{m-1} \end{pmatrix}$$

$$v_p = C \cdot \begin{pmatrix} v(q_0) \\ \vdots \\ v(q_{m-1}) \end{pmatrix} \quad \text{(Eq. 3)}$$

Figure 10:
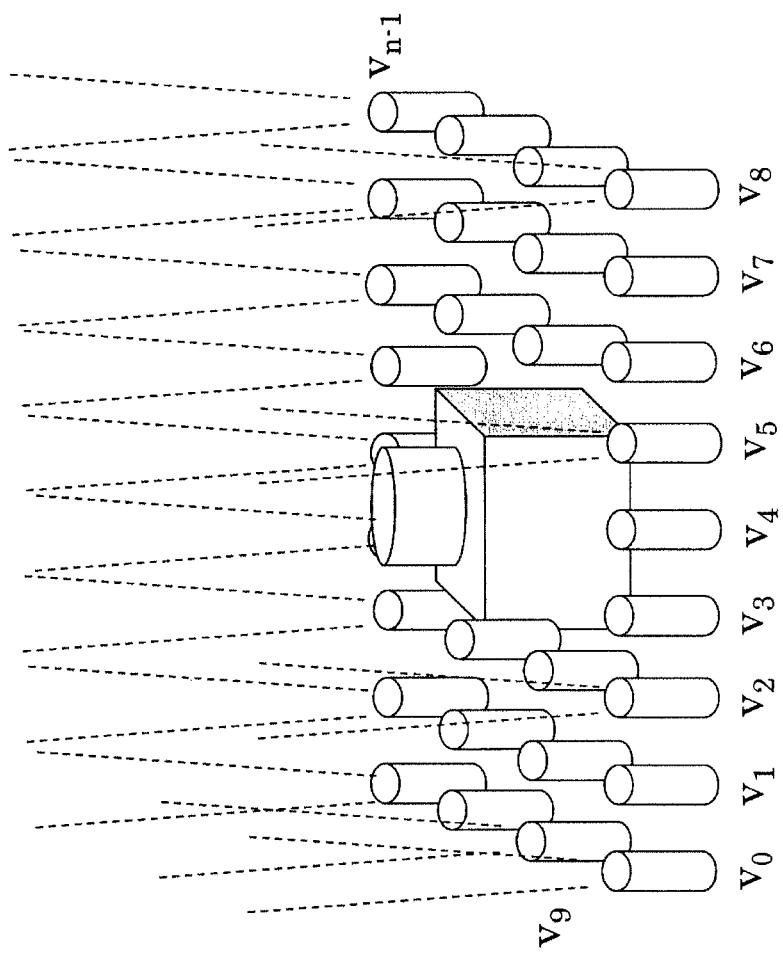
FIG. 10 is a diagram depicting an example of an illumination control parameter of an illumination apparatus of a measurement apparatus.

FIG. 10 is a diagram depicting an example of the illumination control parameter of the illumination device 13 of the measurement apparatus 1. The illumination control parameter of the i-th illumination device 13 is the quantity of light, and is denoted with $v_i$. The vector where the quantity of light $v_i$ of the illumination device 13 is lined up is denoted with v (illumination control parameter vector) (the number of illumination devices 13 is n, and $0 \leq i \leq n-1$).

$$v = \begin{pmatrix} v_0 \\ \vdots \\ v_{n-1} \end{pmatrix}$$

Generally, a control parameter (illumination control parameter) of each illumination device 13 and the quantity of light irradiated from the illumination device 13 onto each area of the subject correspond 1-to-1. The quantity of light irradiated onto each area qi of the subject is denoted with $g_{i,j}(v_i)$, where $v_i$ is an illumination control parameter of the i-th illumination device 13. Normally it is assumed that the illumination control parameter $v_i$ is in proportion to the quantity of light $g_{i,j}(v_i)$ irradiated onto each area $q_i$ of the subject. The illumination control parameter $v_i$ and the vector $g_i(v_i)$ of the quantity of light $g_{i,j}(v_i)$ irradiated onto each area $q_j$ of the subject is given by Eq. 4 using coefficient $e_{i,j}$. E is the coefficient $e_{i,j}$ represented in matrix format.

$$g_i(v_i) = \begin{pmatrix} g_{i,0}(v_i) \\ \vdots \\ g_{i,m-1}(v_i) \end{pmatrix} = \begin{pmatrix} e_{i,0} \cdot v_i \\ \vdots \\ e_{i,m-1} \cdot v_i \end{pmatrix} = \begin{pmatrix} e_{i,0} \\ \vdots \\ e_{i,m-1} \end{pmatrix} \cdot v_i \quad \text{(Eq. 4)}$$

$$E = \begin{pmatrix} e_{0,0} & & e_{n-1,0} \\ & \ddots & \\ e_{0,m-1} & & e_{n-1,m-1} \end{pmatrix}$$

Since the principle of superposition is established for lights, the total quantity of light $g_i(v)$ irradiated onto each area $q_j$ of the subject is the total of quantity of light irradiated from all the illumination devices 13.

$$g_j(v) = \sum_{0 \leq i \leq n-1} g_i(v_i) \quad \text{(Eq. 5)}$$

It is assumed that the quantity of light (of natural light, for example) other than the quantity of light irradiated from the illumination devices 13 is not irradiated, or is constant regardless the position, and hence can be removed. By Eq. 3 and Eq. 5, the illumination control parameter and the brightness value $v_p$ of each pixel of the captured image (collation data) can be corresponded.

$$v_p = C \cdot \begin{pmatrix} v(q_0) \\ \vdots \\ v(q_{m-1}) \end{pmatrix} = C \cdot g_j(v) = C \cdot \sum_{0 \leq i \leq n-1} \begin{pmatrix} e_{i,0} \\ \vdots \\ e_{i,m-1} \end{pmatrix} \cdot v_i \quad \text{(Eq. 6)}$$

$$= C \cdot E \cdot v = \begin{pmatrix} c_0 \cdot e_{0,0} & & c_0 \cdot e_{n-1,0} \\ & \ddots & \\ c_m \cdot e_{0,m-1} & & c_{m-1} \cdot e_{n-1,m-1} \end{pmatrix} \cdot v$$

The remeasurement parameter calculation unit 23 can obtain the quantity of light vector v of the illumination device 13 which provides the desired brightness value $v_p$ (target value) of each pixel by inverse calculation of Eq. 6.

Figure 11:
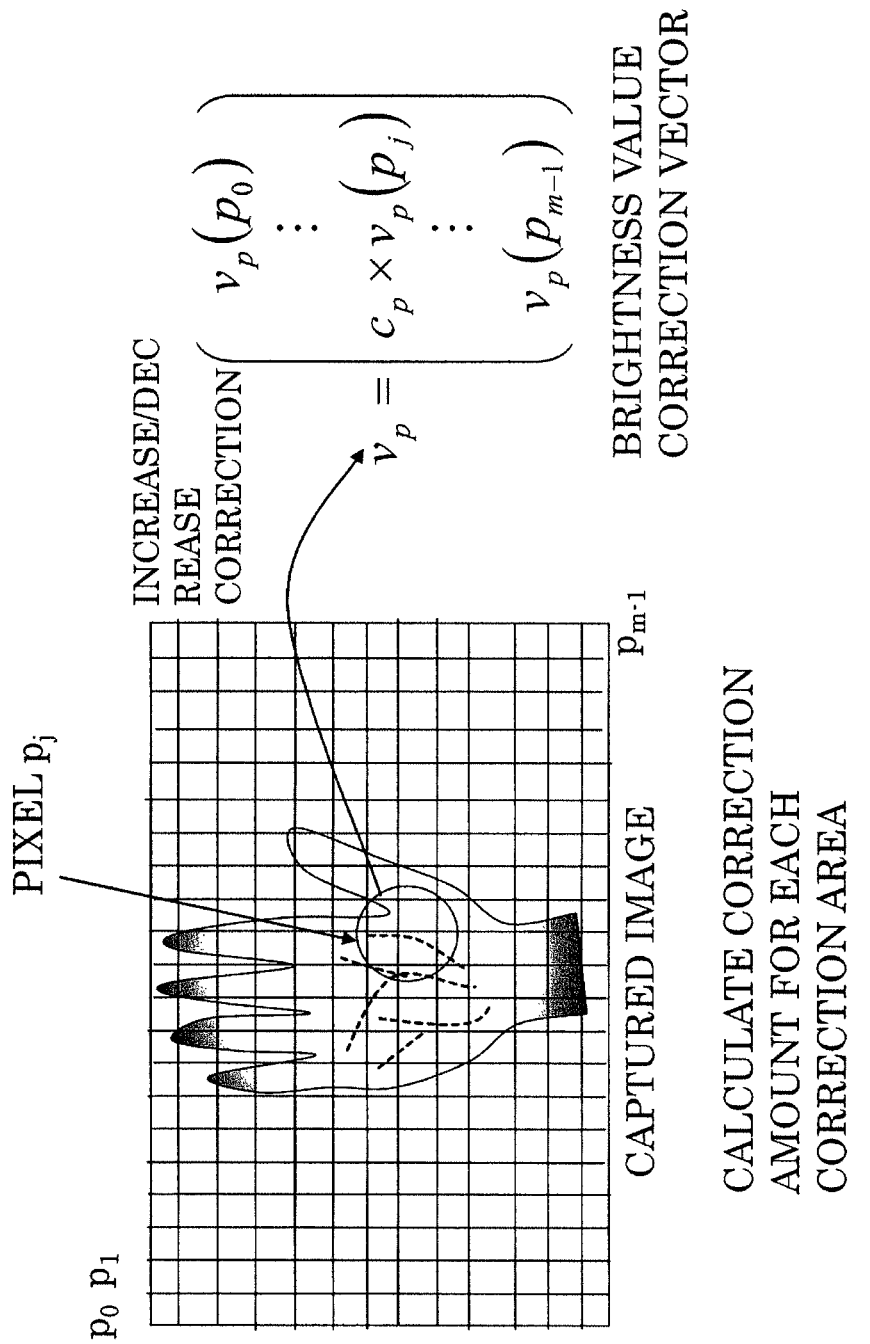
FIG. 11 is a diagram depicting an example of calculation of brightness value correction vector $v_p$.

FIG. 11 is a diagram depicting an example of calculating the brightness value correction vector $v_p$. If the extracted difference portion is too dark because of the polarization of illumination, for example, the brightness value correction vector $v_p$ is determined by multiplying the brightness of the target area measured by the collation data by a coefficient $k_p$, so as to multiply the brightness value of the target area to be an appropriate value. The remeasurement parameter calculation unit 23 can obtain the illumination control parameter v by inverse calculation of Eq. 6 using the calculated brightness value correction vector $v_p$. A case of the extracted area being too dark is, for example, a case of a portion of the collation data that is different from the registered data not reaching the reference brightness value. The reference brightness value is stored in a memory of the processing server 2, for example, as an experimental value or an experiential value.

The appropriate value of the brightness value of each pixel is held as a correspondence table of a brightness value (luminosity) that is generally appropriate for each area of the subject, and a position (e.g. relative distance from the measurement apparatus) of the subject. An appropriate value of the brightness of each pixel, that is calculated according to the position of the subject using a provided function, may be used.

If the illumination control parameter and the area of the subject correspond 1-to-1 in Eq. 6, E is a diagonal matrix. In this case, the illumination control parameter vector v can be easily determined. Hence it is easy to adjust to an illumination state desirable for remeasurement.

However, the number of illuminations is normally less than the number of pixels, and therefore in many cases, a plurality of illumination devices 13 irradiate a plurality of areas of the subject in a superimposing manner. In this case, the number of pixels (n) is greater than the number of illumination control parameters (m). This means that the matrix of Eq. 6 is longitudinally long. Furthermore, non-zero values, other than diagonal elements of E, appear. The inverse calculation of Eq. 6 is more complicated that the case of the 1-to-1 correspondence. In such a case, the remeasurement parameter calculation unit 23 can determine the illumination control parameter vector v using the least square method, for example. If the least square method is used, the following Eq. 7, for example, is used.

$$v = ((C \cdot E)^T (C \cdot E))^{-1} (C \cdot E)^T v_p \quad \text{(Eq. 7)}$$

(2) Adjusting a Plurality of Measurement Parameters

Now an example of controlling not only illumination control parameters but also other measurement parameters, such as focus, in the measurement parameter adjustment processing by the remeasurement parameter calculation unit 23, will be described.

A matrix equation corresponding to Eq. 6 is derived in the same way as the case of adjusting one measurement parameter, based on a conventional theory according to the characteristics of the measurement parameter. For example, it is assumed that the linear relation indicated in Eq. 8 is established when the coefficient matrix is B, another control parameter vector is $v_a$, and object parameter vector is $v_{pa}$.

$$v_{pa} = B \cdot v_a \quad \text{(Eq. 8)}$$

In order to control another parameter $v_a$ along with the illumination control parameter v, the remeasurement parameter calculation unit 23 forms the following mixed equation indicated in Eq. 9. Applying the least square method to this mixed equation, the remeasurement parameter calculation unit 23 determines the illumination control parameter v and another control parameter $v_a$.

$$\text{Mixed Equation:} \begin{pmatrix} v_p \\ v_{pa} \end{pmatrix} = \begin{pmatrix} C \cdot E & 0 \\ 0 & B \end{pmatrix} \cdot \begin{pmatrix} v \\ v_a \end{pmatrix} \quad \text{(Eq. 9)}$$

$$\text{Least Square Solution:} \begin{pmatrix} v \\ v_a \end{pmatrix} =$$

$$\left[ \begin{pmatrix} C \cdot E & 0 \\ 0 & B \end{pmatrix}^T \begin{pmatrix} C \cdot E & 0 \\ 0 & B \end{pmatrix} \right]^{-1} \begin{pmatrix} C \cdot E & 0 \\ 0 & B \end{pmatrix}^T \begin{pmatrix} v_p \\ v_{pa} \end{pmatrix}$$

Depending on the system, such a linear equation as Eq. 9 is not always formed. In this case, the remeasurement parameter calculation unit 23 can control a plurality of different measurement parameters by applying a conventional method, such as extension of the least square method and a similar non-linear optimization calculation.

The remeasurement parameter calculation unit 23 transmits remeasurement parameters obtained by the difference portion extraction processing and the measurement parameter adjustment processing to the measurement apparatus 1. The measurement apparatus 1 sets each parameter to the received remeasurement parameter values.

The authentication result selection unit 24 outputs the authentication result of the authentication subject based on the notice of the authentication result received from the data analysis unit 22 and information on the high score group. If the authentication success of the authentication subject is notified from the data analysis unit 22, the authentication result selection unit 24 outputs the authentication success. In addition to this, the authentication result selection unit 24 transmits the measurement parameters used upon measuring the registered data in the first place in the high score group to the initial measurement parameter update unit 25. If an authentication failure of the authentication subject is notified from the data analysis unit 22, the authentication result selection unit 24 outputs the authentication failure.

Based on the measurement parameters used upon the authentication success, which were received from the authentication result selection unit 24, the initial measurement parameter update unit 25 (corresponds to the "update unit") updates the initial values of the measurement parameters of the measurement apparatus 1. The measurement parameters upon the authentication success can be regarded as more appropriate measurement parameters.

FIG. 12 is a diagram depicting an example of processing for updating initial values of measurement parameters by the initial measurement parameter update unit 25. FIG. 12 indicates a method when an average weighting value α (constant, $0 \leq \alpha \leq 1$) for each parameter based on the measurement parameters before update is used as a parameter. This method, however, can be applied only when the measurement parameters can be changed continuously.

If measurement parameters cannot be changed continuously, the initial measurement parameter update unit 25 holds the continuous parameters internally (internal parameters). The initial measurement parameter update unit 25 updates only the internal parameters, and performs measurement using measurement parameters closest to the internal parameters during the actual measurement. Thereby the initial measurement parameter update unit 25 can update the measurement parameters approximately in the same manner as the case of the measurement parameters which can be changed continuously.

Referring back to FIG. 2, the 1-to-N collation unit 21, the data analysis unit 22, the remeasurement parameter calculation unit 23, the authentication result selection unit 24 and the initial measurement parameter update unit 25 of the processing server 2 are implemented by such an electronic circuit as ASIC (Application Specific Integrated Circuit) or CPU for executing the respective processing executing programs.

<<Operation Example of Data Collation System>>

Figure 13:
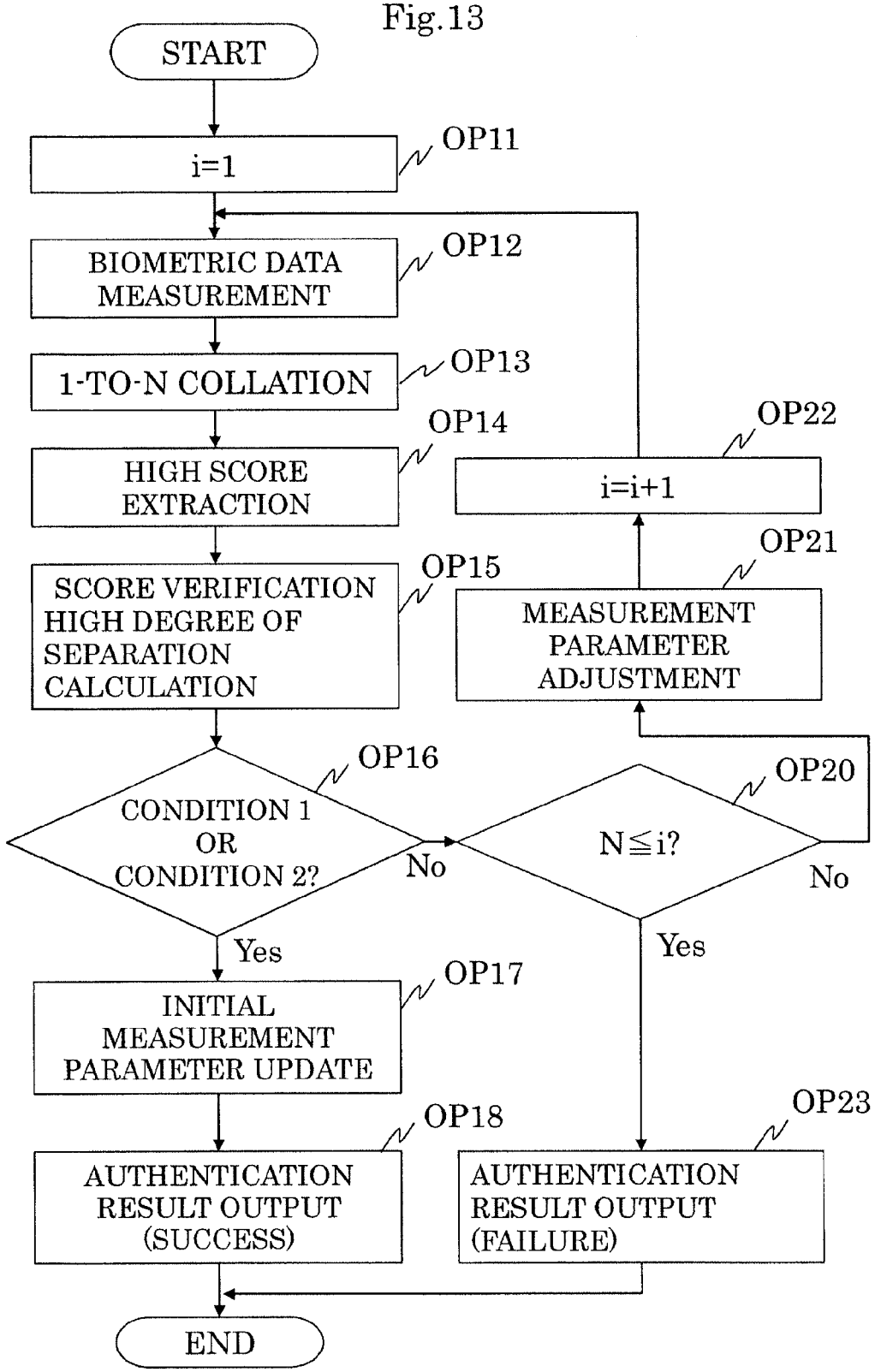
FIG. 13 is a flow chart depicting an operation example of the data collation system.

FIG. 13 is a flow chart depicting an operation example of the data collation system. First the measurement apparatus 1 sets the initial value of the variable i, which indicates a measurement count, to 1, and stands by for the start of authentication of an authentication subject (OP11).

If it is detected that the authentication subject places a hand over the measurement apparatus 1, the measurement apparatus 1 measures the biometric data (palm vein pattern) of the authentication subject (OP12). The measurement apparatus 1 transmits the biometric data (measurement data) of the authentication subject to the processing server 2.

When the measured data of the authentication subject is received, the 1-to-N collation unit 21 of the processing server 2 performs 1-to-N collation of the registered data stored in the registration data base 3 and the measurement data (OP13). The 1-to-N collation unit 21 calculates similarity of each registered data with the measurement data.

Based on the similarity of each registered data calculated by the 1-to-N collation unit 21, the data analysis unit 22 extracts the registered data of which similarity is the threshold 2 or more, that is, the high score group (OP14). The data analysis unit 22 calculates a degree of separation based on the registered data of which similarity is in the first place and the registered data of which similarity is in the second place or less, out of the high score group (OP15). The data analysis unit 22 determines whether the similarity and a degree of separation of the registered data satisfy the following condition 1 or condition 2 (OP16).

(Condition 1) Similarity of registered data in the first place is threshold 1 or more.

(Condition 2) Similarity of the registered data in the first place is greater than the threshold 2 and smaller than threshold 1, and a degree of separation is a predetermined value or more.

If condition 1 or condition 2 is satisfied (OP16: YES), the authentication result selection unit 24 transmits measurement parameters used upon measuring the measurement data to the initial measurement parameter update unit 25 as more appropriate measurement parameters. Using the measurement parameters received from the authentication result selection unit 24, the initial measurement parameter update unit 25 updates the initial values of the measurement parameters of the measurement apparatus 1 (OP17). The authentication result selection unit 24 outputs the authentication success to the authentication subject (OP18).

If neither condition 1 nor condition 2 is satisfied in OP16, the data analysis unit 22 determines whether the variable i to indicate the measurement count is a predetermined value N (e.g. N=3) or more (OP20).

If the variable i is the predetermined value N or more (OP20: YES), the authentication result selection unit 24 outputs the authentication failure to the authentication subject (OP23).

If the variable i is smaller than the predetermined value N (OP20: NO), the remeasurement parameter calculation unit 23 performs measurement parameter adjustment processing based on the measurement data and the registered data (OP21). In addition to this, the remeasurement parameter calculation unit 23 instructs the measurement apparatus 1 to remeasure the biometric data of the authentication subject. In the measurement parameter adjustment processing in OP21, a range of the reference value appropriate for collation is preset for each type (e.g. brightness value, contrast) of the measurement values, for example. In a difference portion between the collation data and the registered data, measurement parameters to be adjusted are determined corresponding to the types of measurement values which are not in the range of the reference value. For example, if the brightness value in the difference portion between the collation data and the registered data is not in the range of the reference value (brightness is adjusted), such a measurement parameter as the illumination intensity, illumination direction and exposure time are adjusted. If the contrast in the difference portion between the collation data and the registered data is not in the range of the reference value (degree of blur (e.g. out of focus) is adjusted), such a measurement parameter as a focus position of the image sensor is adjusted. If the measurement parameters to be adjusted are determined, the remeasurement parameter calculation unit 23 determines the measurement parameters using Eq. 6, Eq. 7, Eq. 8 or Eq. 9, for example. The contrast is defined as a difference of the brightness values in a bright portion and in a dark portion of the image data.

The variable i is set to a value of 1 added to the variable i (OP22). Using the measurement parameters calculated by the remeasurement parameter calculation unit 23 in OP21, the measurement apparatus 1 remeasures the biometric data of the authentication subject. Then the processing from OP12 to OP16 is repeated.

For example, it is assumed that the variable i to indicate the measurement count is 1, that is, the first measured data, the registered data in the first place and the registered data in the second place are the data illustrated in FIG. 8 respectively. If the registered data in the first place and the registered data in the second place illustrated in FIG. 8 satisfy neither condition 1 nor condition 2, the measurement parameters are adjusted so that the circled area in FIG. 8 can be accurately measured. Using the measurement parameters, the biometric data of the authentication subject is remeasured. The measured data and the registered data are then collated 1-to-N, and the similarities of the degree of separation in the high score group are verified. It is assumed that the measured data obtained by the remeasurement, the registered data in the first place and the registered data in the second place are the data illustrated in FIG. 14. In this case, the circled area in the measurement data (collation data), of which identification is difficult in FIG. 8, becomes clear, and the registered data in the first place and the registered data in the second place can be distinguished, and the degree of separation increases. Finally, the collation result in which the degree of separation is the highest is used as the final collation result.

The measurement may be repeated more while the authentication subject can maintain a posture (e.g. one second), until condition 1 or condition 2 is satisfied, or until reaching the upper limit value N of the measurement count. In other words, the biometric data is remeasured while the posture of the authentication subject is unchanged. In the first embodiment, it is assumed that the parameters on the posture (e.g. distance between the palm and the measurement apparatus 1, angle of hand) of the authentication subject do not change during the authentication processing in FIG. 13.

<<Functional Effect of First Embodiment>>

In the first embodiment, the measurement parameter adjustment processing is performed if neither condition 1 nor condition 2 is satisfied after the 1-to-N collation of the measured data and registered data. By remeasuring the biometric data using the adjusted measurement parameters, the degree of separation among registered data increases and reliability of the collation result increases. As a result, the authentication errors can be controlled. Particularly in the case when determining the collation result is difficult, such as the case when the similarity of the registered data in the first place is between the threshold 1 and the threshold 2 and the degree of separation thereof is a predetermined value or less, generation of authentication errors can be controlled. Furthermore, even if the registered data of which similarity is the threshold 2 or more does not exist, the biometric data is remeasured and recollated, so the generation of authentication failure, despite an authentic person being the subject, can be controlled. Since the measurement of the biometric data is repeated within the time when the posture of the authentication subject does not change, one authentication operation is sufficient for the authentication subject, and convenience improves.

The initial values of the measurement parameters are updated so as to approach the measurement parameters of the measured data when authentication succeeded (so as to increase the degree of separation). Thereby when the same authentication subject (or collation data state, such as posture) is authenticated the next time or later, a more reliable authentication (less authentication errors) can be performed.

The data collation system of the first embodiment is implemented by basic apparatuses, such as a measurement apparatus, processing server and data base, and other apparatuses (e.g. apparatus which executes other authentication methods) are not requested. Therefore the data collation system can be implemented at low cost.

The present invention provides a technology to collate input data and registered data, which controls errors such as recognizing registered data of a measurement subject that is different from a measurement subject of the input data as data of the measurement subject of the input data, and still has high convenience.

Second Embodiment

The second embodiment is different from the first embodiment in terms of the operation of the data collation system. Herein below, description on the areas that are the same as the first embodiment will be omitted, and only differences will be described.

Figure 15:
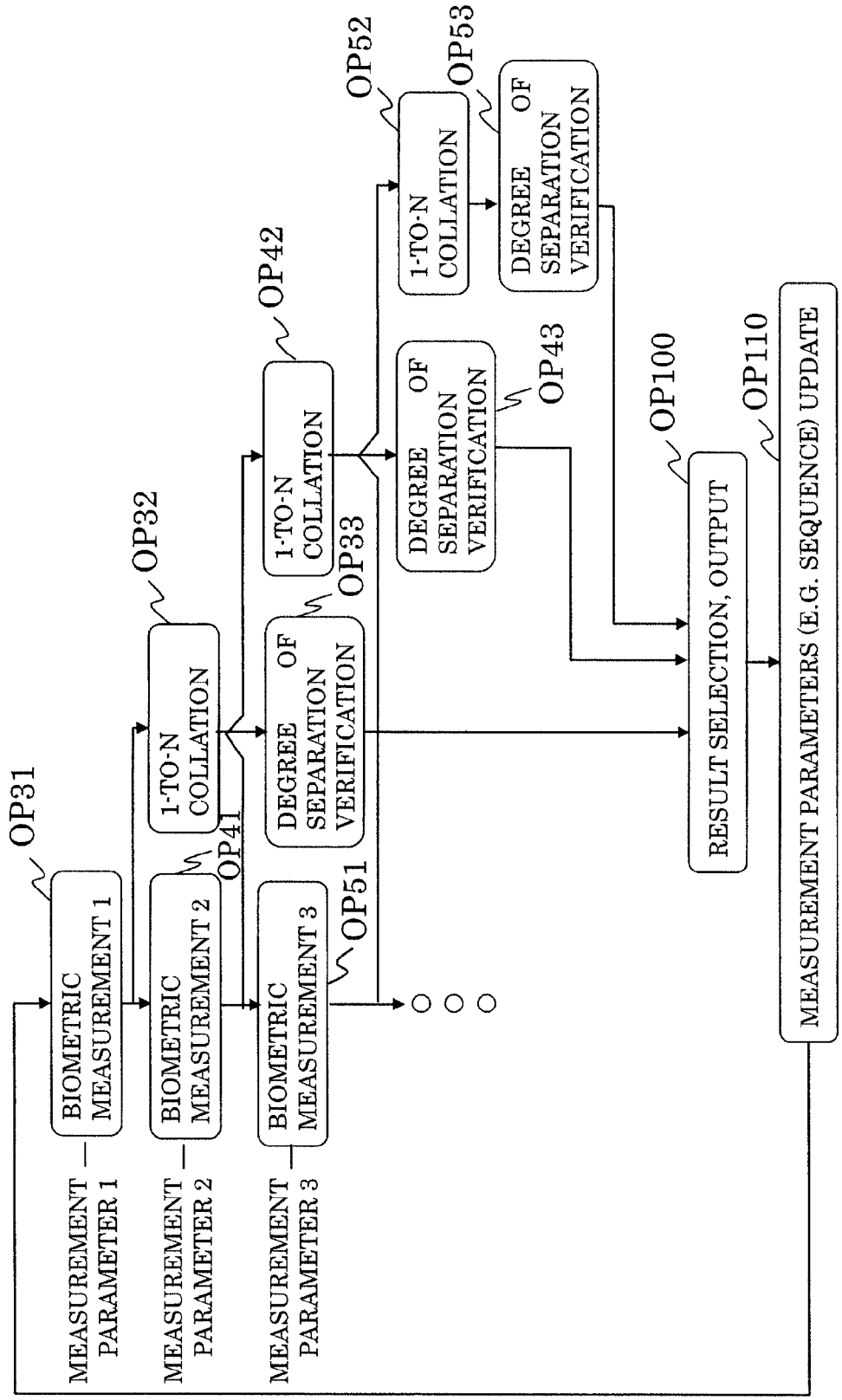
FIG. 15 is a flow chart depicting an operation example of the data collation system.

FIG. 15 is a flow chart depicting an operation example of a data collation system according to the second embodiment. In the first embodiment, authentication processing is performed using one set of measurement parameters. In the second embodiment, on the other hand, a plurality of sets of measurement parameters is provided, and the vein pattern of an authentication subject is measured a plurality of times using each set of the measurement parameters, and authentication processing on the plurality of measured data items is performed in parallel.

The measurement apparatus 1 has three sets of measurement parameters, that is, measurement parameters 1, measurement parameters 2 and measurement parameters 3, for example. The measurement parameters 1 are for the quantity of light of the illumination devices 13 so that the entire palm of the authentication subject is irradiated uniformly, for example. The measurement parameters 2 are for the quantity of light of the illumination devices 13 so that lights are irradiated more onto the wrist side of the palm of the authentication subject. The subject parameters 3 are for the quantity of light of the illumination devices 13 so that lights are irradiated more onto the finger side of the palm of the authentication subject.

The measurement apparatus 1 measures the biometric data of the authentication subject continuously three times, for example (OP31, OP41, OP51). The measurement apparatus 1 performs the first measurement using the measurement parameters 1 (OP31). The measurement apparatus 1 performs the second measurement using the measurement parameters 2 (OP41). The measurement apparatus 1 performs the third measurement using the measurement parameters 3 (OP51). Out of the three continuous measurements, the measured data obtained in the first measurement is called "measured data 1". The measured data obtained in the second measurement is called "measured data 2". The measured data obtained in the third measurement is called "measured data 3". The measurement apparatus 1 transmits the measured data 1 to the measured data 3 to the processing server 2.

The 1-to-N collation unit 21 (corresponds to the "collation unit") of the processing server 2 performs the 1-to-N collation with the registered data for the measured data 1 to the measured data 3 respectively (OP32, OP42, OP52). Then the data analysis unit 22 (corresponds to the "determination unit") of the processing server 2 performs the degree of separation verification processing similar to OP14 to OP16 in FIG. 14 of the first embodiment, for the measured data 1 to the measured data 3 respectively (OP33, OP43, OP53). The data analysis unit 22 transmits the collation result with each of the measured data 1 to the measured data 3 to the authentication result selection unit 24. The collation result of the measured data at least includes the similarity of the registered data of which similarity to each measured data is in the first place and the degree of separation.

The authentication result selection unit 24 (corresponds to the "selection unit") selects a most appropriate result out of the respective collation results of the measured data 1 to the measured data 3, and outputs the authentication result to the authentication subject (OP100).

Figure 16:
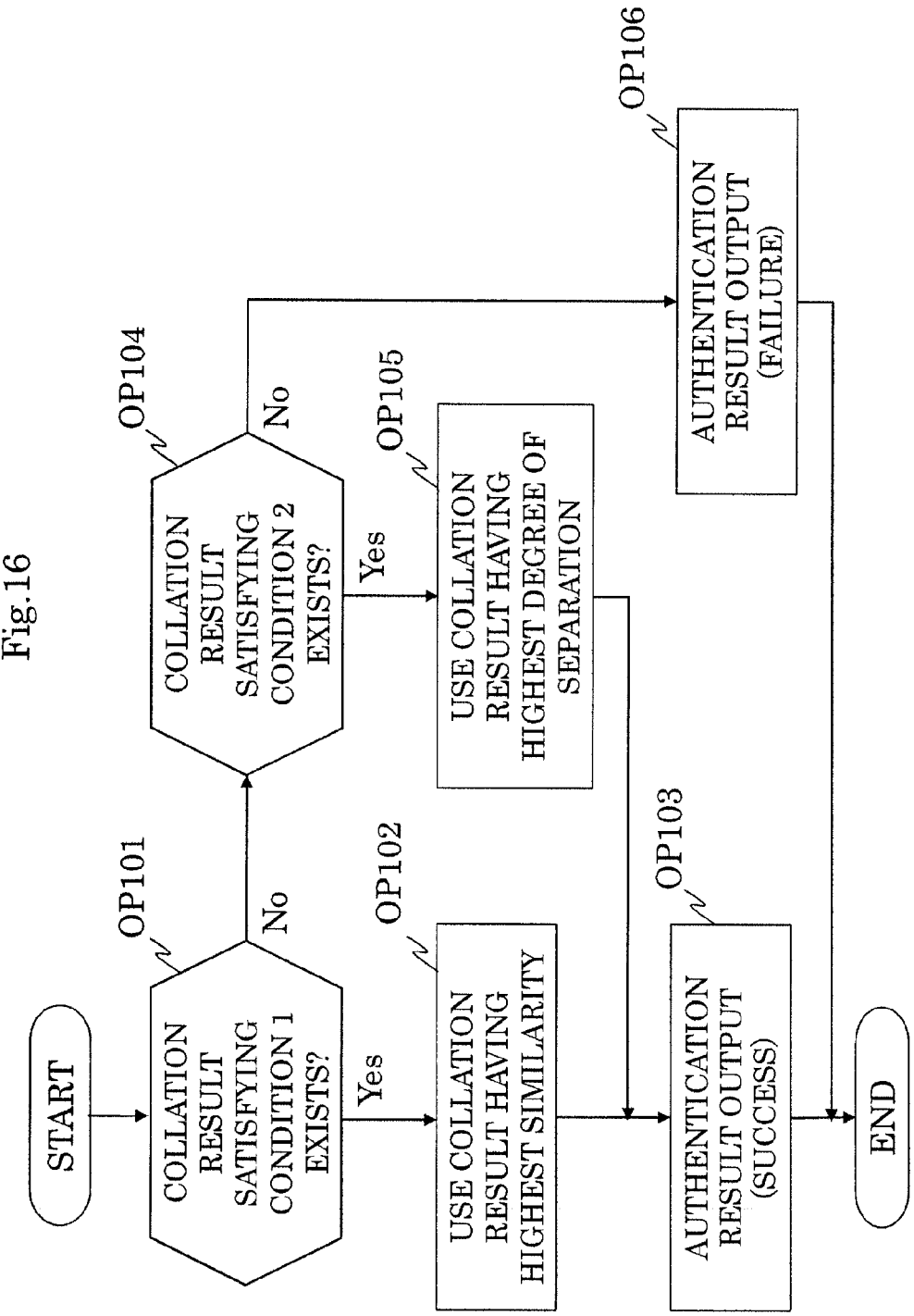
FIG. 16 is a flow chart depicting an example of determination processing when a more appropriate collation result is selected from the collation result.

FIG. 16 is a flow chart depicting an example of the determination processing for the authentication result selection unit 24 to select a most appropriate collation result out of the collation result of each measured data. The authentication result selection unit 24 determines whether there is any of the collation results of the measured data 1 to the measured data 3 which satisfy condition 1 (see the first embodiment) (OP101). If there is a collation result which satisfies condition 1 (OP101: YES), the collation result of the measured data where the similarity of the registered data in the first place is the highest is used, out of the collation result of the measured data which satisfies condition 1 (OP102). The authentication result selection unit 24 outputs the authentication success to the authentication subject (OP103).

If there is no collation result which satisfies condition 1 (OP101: NO), then the authentication result selection unit 24 determines whether there is any collation result which satisfies condition 2 (OP104). If there is a collation result which satisfies condition 2 (OP104: YES), the collation result of the measured data of which degree of separation is highest is used, out of the collation result of the measured data which satisfies condition 2 (OP105). The authentication result selection unit 24 outputs the authentication success to the authentication subject (OP103).

If there is no collation result which satisfies condition 2 (OP104: NO), the authentication result selection unit 24 outputs the authentication failure to the authentication subject (OP106).

Referring back to FIG. 15, in the case of the authentication success, the initial measurement parameter update unit 25 (corresponds to the "update unit") updates the measurement parameters 1 to the measurement parameters 3 using the measurement parameters with which the adopted collation result was obtained (OP110). For the method for updating the measurement parameters 1 to the measurement parameters 3, the method for updating the initial values of the measurement parameters in the first embodiment, for example, can be used.

In this case, the sequence of the sets of the measurement parameters to be used for the measurement may be switched according to the collation result of the adopted measured data.

In the second embodiment, the biometric data is continuously obtained using the sets of the measurement parameters having different values, and the collation processing is performed in parallel for each of the measured data. Thereby overhead on the processing server 2 due to the repeat of collation processing can be prevented, and measurement can be performed before a change in the subject occurs, such as movement of the authentication subject and a change in the environment, and as a result, stability and reliability increase.

Variation

In the first embodiment and the second embodiment, the non-contact type palm vein authentication was described as an example. The data collation system of the first embodiment or the second embodiment can also be applied to biometric authentication other than the non-contact palm vein authentication. For example, the data collation system of the first embodiment or the second embodiment can be applied to authentication with a fingerprint pattern using a capacitance sensor.

Figure 17:
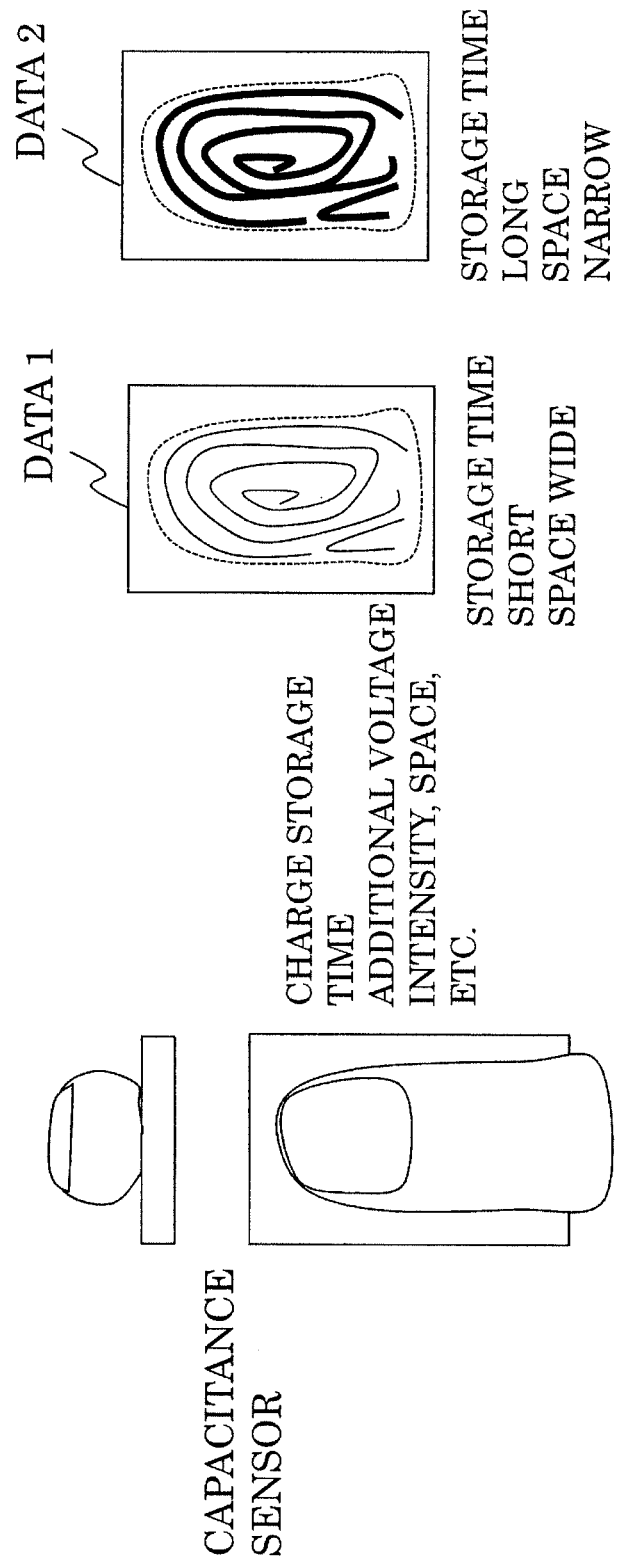
FIG. 17 is a diagram depicting an example of fingerprint authentication by a capacitance sensor.

FIG. 17 is a diagram depicting an example of fingerprint authentication using a capacitance sensor. In the case of fingerprint authentication using a capacitance sensor, measurement parameters that can be controlled are, for example, additional voltage intensity, charge storage time and measurement interval for the subject. Data 1 and data 2 in FIG. 17 indicate the change of biometric data when the charge storage time and the measurement interval were changed. In data 1, the line patterns are clearly separated in the measurement. In data 2, however, the line patterns are spread out and the lines are mixed, due to such reasons as the charge storing time taking too long, or the measurement interval being too wide. Since the skin status is different that depends very much on the time and location of the biological subject (finger) and depending on the individual, biometric data can also change in various ways.

To apply the data collation system of the first embodiment or second embodiment to the fingerprint authentication by a capacitance sensor, the measurement parameters are replaced with the measurement parameters of the capacitance sensor. For remeasurement, the authentication subject is prompted to contact the capacitance sensor again. Thereby the data collation system of the first embodiment or the second embodiment can be applied to the fingerprint authentication by the capacitance sensor.

The 1-to-N collation method, the similarity calculation method, the degree of separation calculation method, the method for verifying registered data and collation data, the measurement parameter adjustment method and the method for updating initial values of the measurement parameters according to the first embodiment and the second embodiment are all examples, and the present invention is not limited to these methods.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions have been described in detail, it should be understood that the various changes, substitutions, and alterations could be made hereto without departing from the spirit and scope of the invention.

What is claimed is:

1. A data collation apparatus, comprising:
 a collation unit to calculate a similarity to indicate a degree of correspondence between input data which is measured by a measurement apparatus having at least one measurement parameter, and registered data which is stored in a storage apparatus in advance, for each of a plurality of registered data items respectively; and
 a calculation unit to adjust the at least one measurement parameter, when a difference between the similarity of first registered data of which similarity with the input data is highest and the similarity of second registered data of which similarity with the input data is second highest, among the plurality of registered data items, is smaller than a first predetermined value, or when a degree of separation to indicate a distance between the similarity of the first registered data and a similarity distribution of a group of registered data items of which similarities with the input data are second highest or lower is smaller than a second predetermined value, based on at least the input data and the first registered data, and to instruct the measurement apparatus to remeasure the measurement subject of the input data.

2. The data collation apparatus according to claim 1, further comprising:
 a determination unit to determine,
  (a) when the similarity of the first registered data and the input data is higher than a first threshold,
  (b) when the similarity of the first registered data and the input data is between the first threshold and a second threshold which is a value lower than the first threshold, and the difference of the similarities is the first predetermined value or more,
  or
  (c) when the similarity of the first registered data and the input data is between the first threshold and the second threshold, and the degree of separation is the second predetermined value or more,
 that the first registered data and the input data are measured data obtained from a same measurement subject; and
 an update unit to update, when it is determined that the input data and the first registered data are measurement data obtained from a same measurement subject, an initial value of the at least one measurement parameter of the measurement apparatus based on the at least one measurement parameter used for measuring the input data.

3. A data collation apparatus, comprising:
 a collation unit to calculate a similarity to indicate a degree of correspondence between two or more input data items which are measured by a measurement apparatus having a plurality of sets including a plurality of measurement parameters and using each of the sets, and each of a plurality of registered data which is stored in a storage apparatus in advance, for each of the input data items;
 a determination unit to determine,
  (a) when a similarity of first registered data of which similarity with the input data is highest, among the plurality of registered data items, is higher than a first threshold,
  (b) when the similarity of the first registered data is between the first threshold and a second threshold which is a value lower than the first threshold, and the difference between the similarity of the first registered data and the similarity of second registered data of which similarity with the input data is second highest is a first predetermined value or more,
  or
  (c) when the similarity of the first registered data is between the first threshold and the second threshold, a degree of separation to indicate a distance between the similarity of the first registered data and a similarity distribution of a group of registered data items of which similarities with the input data are second highest or lower is greater than a second predetermined value,
 that the first registered data and the input data are measurement data obtained from a same measurement subject, for each of the two or more input data items;
 a selection unit to select, among the input data items determined to be the measurement data obtained from the same measurement subject as that of the first registered data, input data for which the difference of the similarities between the first registered data and the second registered data is greatest, or input data for which the degree of separation from the similarity distribution of the group of registered data items of which similarities with the input data are second highest or lower, is the greatest,
 an update unit to update each of the plurality of sets including the plurality of measurement parameters, based on the set including the plurality of measurement parameters used for measuring the input data selected by the selection unit.

4. A tangible recording medium recording a program executed by a computer, comprising:
 calculating a similarity to indicate a degree of correspondence between input data which is measured by a measurement apparatus having at least one measurement parameter, and registered data which is stored in a storage apparatus in advance, for each of a plurality of registered data items respectively;
 adjusting the at least one measurement parameter, (a) when a similarity of first registered data of which similarity with the input data is highest, among the plurality of registered data items, is lower than a first threshold, and a difference between the similarity of the first registered data and the similarity of second registered data of which similarity with the input data is second highest, is smaller than a first predetermined value, or (b) when the similarity of the first registered data is lower than the first threshold, and a degree of separation to indicate a distance between the similarity of the first registered data and a similarity distribution of a group of registered data items of which similarities with the input data are second highest or lower is smaller than a second predetermined value, based on at least the input data and the first registered data; and
 instructing the measurement apparatus to remeasure the measurement subject of the input data.

* * * * *